United States Patent
Kulpati et al.

(10) Patent No.: US 10,902,397 B2
(45) Date of Patent: Jan. 26, 2021

(54) INTEROPERABLE FINANCIAL TRANSACTIONS VIA MOBILE DEVICES

(71) Applicant: Visa International Service Association, San Francisco, CA (US)

(72) Inventors: Ashish Kulpati, Gurgaon (IN); Joseph Gordon Cooper, Singapore (SG); Ginger Baker, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/675,023

(22) Filed: Nov. 5, 2019

(65) Prior Publication Data

US 2020/0175488 A1    Jun. 4, 2020

Related U.S. Application Data

(60) Division of application No. 15/376,994, filed on Dec. 13, 2016, now Pat. No. 10,504,082, which is a
(Continued)

(51) Int. Cl.
*G06Q 20/16* (2012.01)
*G06Q 20/32* (2012.01)
(Continued)

(52) U.S. Cl.
CPC ............. *G06Q 20/16* (2013.01); *G06Q 20/10* (2013.01); *G06Q 20/102* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 5,703,344 A   12/1997  Bezy et al.
6,085,081 A    7/2000  Leskinen
(Continued)

FOREIGN PATENT DOCUMENTS

EP        1245011 A1      10/2002
KR    20040103581 A      12/2004
(Continued)

OTHER PUBLICATIONS

"Send funds via an app without a/c number", The Times of India, New Delhi @Aug. 7 (Year: 2016).*
(Continued)

*Primary Examiner* — Frantzy Poinvil
(74) *Attorney, Agent, or Firm* — Kilpatrick Townsend & Stockton LLP

(57) ABSTRACT

A method and system provide interoperable electronic financial services using mobile communications devices and without the need for traditional banking systems like plastic cards, POS machines, branches and ATMs. A consumer can deposit and/or withdraw money from his account using his mobile device and with the help of a local agent without ever stepping inside a branch of a bank where the consumer has an account. The system uses the consumers ID and his mobile number to generate a PAN for the consumer, which is then used to route the transactions. The system uses indicators in the transaction to identify transaction purpose and thus enable appropriate interchange, clearing and settlement between participating entities. The system provides real-time feedback on the transactions and reduces costs by enabling an agent to service consumers of multiple banks and payment service providers.

20 Claims, 21 Drawing Sheets

Related U.S. Application Data continuation of application No. 14/006,427, filed as application No. PCT/US2012/033083 on Apr. 11, 2012, now Pat. No. 9,552,573.

(60) Provisional application No. 61/474,216, filed on Apr. 11, 2011.

(51) Int. Cl.
*G07F 19/00* (2006.01)
*G06Q 20/10* (2012.01)
*G06Q 20/40* (2012.01)

(52) U.S. Cl.
CPC ....... *G06Q 20/3223* (2013.01); *G06Q 20/401* (2013.01); *G07F 19/203* (2013.01)

(58) Field of Classification Search
USPC .......................................................... 705/44
See application file for complete search history.

(56) References Cited

U.S. PATENT DOCUMENTS

| | | | |
|---|---|---|---|
| 6,879,965 B2 | 4/2005 | Fung et al. | |
| 7,264,154 B2 | 9/2007 | Harris | |
| 7,366,695 B1 | 4/2008 | Allen-Rouman | |
| 7,444,674 B1 | 10/2008 | Etique et al. | |
| 7,657,482 B1 | 2/2010 | Shirey | |
| 7,668,769 B2 | 2/2010 | Baker | |
| 7,685,037 B2 | 3/2010 | Reiners et al. | |
| 7,712,655 B2 | 5/2010 | Wong | |
| 7,753,265 B2 | 7/2010 | Harris | |
| 8,020,763 B1 | 9/2011 | Kowalchyk | |
| 8,036,981 B2 | 10/2011 | Shirey | |
| 8,074,879 B2 | 12/2011 | Harris | |
| 8,332,315 B2 | 12/2012 | Tullis | |
| 8,538,870 B2 | 9/2013 | Allen-Rouman et al. | |
| 8,589,293 B2 | 11/2013 | Singh | |
| 8,595,083 B2* | 11/2013 | O'Leary | G06Q 20/40 705/26.1 |
| 8,626,653 B1 | 1/2014 | Krikorian | |
| 8,635,153 B2 | 1/2014 | Singh | |
| 8,694,425 B2* | 4/2014 | O'Leary | G07F 17/42 705/39 |
| 8,756,161 B2 | 6/2014 | Hasson et al. | |
| 8,762,211 B2* | 6/2014 | Killian | G06Q 20/3221 705/17 |
| 9,547,960 B2* | 1/2017 | Thomas | G06Q 20/3563 |
| 2002/0147685 A1* | 10/2002 | Kwan | G06Q 20/102 705/44 |
| 2002/0164031 A1 | 11/2002 | Piikivi | |
| 2003/0004870 A1 | 1/2003 | Van Rensburg et al. | |
| 2003/0149662 A1 | 8/2003 | Shore | |
| 2003/0225703 A1 | 12/2003 | Angel | |
| 2006/0229998 A1 | 10/2006 | Harrison et al. | |
| 2007/0179885 A1 | 8/2007 | Bird et al. | |
| 2007/0255653 A1 | 11/2007 | Tumminaro | |
| 2008/0133403 A1 | 6/2008 | Hamzeh | |
| 2008/0257952 A1 | 10/2008 | Zandonadi | |
| 2009/0070272 A1 | 3/2009 | Jain | |
| 2009/0106148 A1 | 4/2009 | Prada | |
| 2009/0132415 A1 | 5/2009 | Davis et al. | |
| 2009/0234772 A1 | 9/2009 | Van Rensburg et al. | |
| 2009/0240626 A1 | 9/2009 | Hasson et al. | |
| 2009/0305669 A1 | 12/2009 | Eonnet et al. | |
| 2010/0153221 A1 | 6/2010 | Esplin | |
| 2010/0287085 A1 | 11/2010 | Joubert et al. | |
| 2011/0055077 A1 | 3/2011 | French | |
| 2011/0269438 A1 | 11/2011 | Narendra | |
| 2011/0270744 A1 | 11/2011 | Baker | |
| 2012/0095918 A1 | 4/2012 | Jurss | |
| 2012/0185315 A1 | 7/2012 | VonDerheide et al. | |
| 2012/0303526 A1* | 11/2012 | Csoka | G06Q 20/32 705/44 |
| 2013/0073365 A1 | 3/2013 | McCarthy | |
| 2013/0124405 A1 | 5/2013 | Hamzeh | |
| 2013/0218769 A1 | 8/2013 | Pourfallah et al. | |
| 2014/0263618 A1 | 9/2014 | McCarthy et al. | |
| 2016/0012400 A1* | 1/2016 | McCarthy | G06Q 20/12 705/73 |
| 2018/0365680 A1* | 12/2018 | Davis | G06Q 20/3224 |

FOREIGN PATENT DOCUMENTS

| | | |
|---|---|---|
| KR | 20050023049 A | 3/2005 |
| KR | 20060115967 A | 11/2006 |
| KR | 20070097687 A | 10/2007 |
| WO | 2001/055984 A1 | 8/2001 |
| WO | 2001/061578 A1 | 8/2001 |
| WO | 2005/081512 A1 | 9/2005 |
| WO | 2009/101496 A1 | 8/2009 |
| WO | 2010/089593 A1 | 8/2010 |

OTHER PUBLICATIONS

International Search Report and Written Opinion dated Oct. 30, 2012 in PCT/US2012/033083, 9 pages.

Instant Interbank Mobile Payment Service (IMPS), [online], [retrieved on Dec. 23, 2013], Retrieved from National Payments Corporation of India at <URL: http://www.npci.org.in/documents/IMPSFlow.pdf>, 11 pages.

"Christopher P. Beshouri, Christopher, P., et al., Capturing the promise of mobile banking in emerging markets," McKinsey Quarterly, Feb. 2010, 10 pages.

Mas, Ignacia, et al., "Designing Mobile Money Services Lessons from M-PESA," Innovations, Spring 2009, pp. 77-91.

"Fed Near Format Choice for Wire Remittance Data", Bills, Steve, American Banker, vol. 173 Issue 69, p. 17-17, 1/2p (Year: 2008).

"P2PM-pay: Person to Person Mobile Payment Scheme Controlled by Expiration Date", Martinez-Pelaez et al, Springer Science+Business Media. (Year: 2015).

* cited by examiner

INTEROPERABLE FINANCIAL TRANSACTIONS VIA MOBILE DEVICES

CROSS REFERENCE TO RELATED APPLICATIONS

This application is a divisional application of U.S. patent application Ser. No. 15/376,994, filed on Dec. 13, 2016, now U.S. Pat. No. 10,504,082 which is a continuation application of U.S. patent application Ser. No. 14/006,427, filed on Dec. 24, 2013, now U.S. Pat. No. 9,552,573, which is a 371 of international application no. PCT/US2012/033083 filed Apr. 11, 2012, which claims the benefit of the filing date of U.S. Provisional Patent Application No. 61/474,216, filed on Apr. 11, 2011, which are all is herein incorporated by reference in their entirely for all purposes.

BACKGROUND

A typical transaction infrastructure in developed areas in the United States may comprise wired networks that connect merchants to a payment processing network via acquirer computers. This transaction infrastructure allows users in developed areas to easily conduct payment transactions. The transaction infrastructure in developed areas of the world can allow people to conduct transactions such as credit, debit, money transfer, and banking transactions.

Some underdeveloped and/or remote regions of the world do not have the transaction infrastructure that is present in developed regions of the world. Even though a traditional transaction infrastructure is not available to them, people in these remote and under-developed regions have the same financial service needs, e.g., savings, payments, transfers, credit, insurance, etc. as those in developed regions.

What is therefore needed is a secure and efficient technological solution to allow people in remote and/or under-developed regions to perform transactions such as financial transactions, even though a typical transaction infrastructure is not available.

Embodiments of the invention address these and other problems, individually and collectively.

SUMMARY

Embodiments of the present invention provide a mobile phone based financial transaction platform (e.g., a banking platform) to enable financial transactions. Such financial transactions include, banking transactions such as deposit and withdrawals from an account, money transfer from one person to another, bill pay services, ATM withdrawals, etc.

Some embodiments of the present invention provide a system for conducting banking transactions using a mobile communication device. The system includes a consumer account processor (which may be an example of a user account processing server computer) that can communicate with a consumer mobile device (which may be an example of a mobile communication device) and process transactions related to the consumer account, an agent account processor (which may be an example of an agent account processing server) that can communicate with a mobile device of an agent and process transactions for the agent, a universal gateway for managing communications to and from the consumer mobile device and the agent mobile device, and a payment processing network to process the payment transactions.

In some embodiments, the present invention provides methods for conducting several types of banking transactions including, but not limited to depositing money into an account, withdrawing money from an account, transferring money from one entity to another, paying for bills, and withdrawing funds from an ATM.

In one embodiment of the invention, a method performed by a first server computer to conduct financial transactions is described. The method comprises receiving, at a first server computer associated with a first entity, a set of data elements to transfer funds from the first entity operating a mobile communication device to a second entity from a communication via a communications network. The set of data elements includes a mobile communication device identifier used by the second entity or a second entity identifier, and an amount associated with the funds to be transferred. Then the first server computer generates a transaction request message, wherein the transaction request message comprises a transaction type indicator, the amount associated with the funds to be transferred, and the mobile communication device identifier used by the second entity. The method further comprises transmitting the transaction request message to a second server computer associated with the second entity, via a payment processing network, and receiving a transaction response message from the second server computer via the payment processing network. The transaction response message indicates whether or not the transfer of funds is approved.

In another embodiment of the invention, the transfer of funds is a deposit transaction. In this case, the transaction type indicator is a deposit transaction indicator. When the transfer of funds is a deposit transaction, the first server computer is an agent account processing server computer, and the second server computer is a user account processing server computer. The transaction request message is an original credit transaction request message and the transaction response message is an original credit transaction response message.

In another embodiment of the invention, the transfer of funds is a withdrawal transaction. In this case, the transaction type indicator is a withdrawal transaction indicator. When the transfer of funds is a withdrawal transaction, the first server computer is a user account processing server computer, and the second server computer is an agent account processing server computer. The transaction request message is an original credit transaction request message, and the transaction response message is an original credit transaction response message.

Another embodiment of the invention is related to a first server computer comprising a processor, and a non-transitory computer-readable medium coupled to the processor, the non-transitory computer-readable medium comprising code executable by the processor for implementing a method. The method comprises receiving, at a first server computer, a set of data elements to transfer funds from a first entity operating a mobile communication device to a second entity from a communication via a communications network. The set of data elements includes a mobile communication device identifier used by the second entity or a second entity identifier, and an amount associated with the funds to be transferred. Then the first server computer generates a transaction request message, wherein the transaction request message comprises a transaction type indicator, the amount associated with the funds to be transferred, and the mobile communication device identifier used by the second entity. The method further comprises transmitting the transaction request message to a second server computer, via a payment processing network, and receiving a transaction response message from the second server computer via the payment processing network. The transaction response message indicates whether or not the transfer of funds is approved.

Another embodiment of the invention is related to a method performed by a central server computer to conduct financial transactions. The method comprises receiving, from a first server computer associated with a first entity and at a central server computer, a transaction request to transfer funds from the first entity to a second entity, wherein the transaction request comprises a transaction type indicator, an amount associated with the transfer of funds, and a mobile communications device identifier used by the second entity or a second entity identifier. The central server computer then parses the transaction request message, determines a second server computer associated with the second entity, and transmits the transaction request message to the second server computer. The method comprises the central server computer receiving a transaction response message from the second server computer, parsing the transaction response message, and determining the first server computer. The central server computer then transmits the transaction response message to the first server computer.

Another embodiment of the invention is related to a central server computer comprising a processor, and a non-transitory computer readable medium coupled to the processor, the non-transitory computer readable medium comprising code executable by the processor for implementing a method. The method comprises receiving, from a first server computer associated with a first entity and at a central server computer, a transaction request to transfer funds from the first entity to a second entity, wherein the transaction request comprises a transaction type indicator, an amount associated with the transfer of funds, and a mobile communications device identifier used by the second entity or a second entity identifier. The central server computer then parses the transaction request message, determines a second server computer associated with the second entity, and transmits the transaction request message to the second server computer. The method comprises the central server computer receiving a transaction response message from the second server computer, parsing the transaction response message, and determining the first server computer. The central server computer then transmits the transaction response message to the first server computer.

In another embodiment of the invention, a method of withdrawing funds from a second entity device is described. The method comprises receiving, at a first server computer associated with a first entity, a set of data elements to withdraw funds from the first entity operating a mobile communication device from a communication via a communications network, wherein the set of data elements comprises an amount associated with the funds to be withdrawn. Then the first server computer derives a one-time temporary use account identifier and an associated one-time temporary use access code (e.g., a one time PIN). The method further comprises the first server computer transmitting the one-time temporary use account identifier to the mobile communications device, and transmitting the one-time temporary access code to the mobile communications device in a separate message from the one-time temporary use account identifier. The first server computer then receives a transaction request message from a second server computer associated with a second entity, after the second entity has received entry of the one-time temporary account identifier and the associated one-time temporary use access code, via a payment processing network. The transaction request message comprises the amount, the one-time temporary account identifier, and the associated one-time temporary access code. The first server computer then transmits a transaction response message to the second server computer associated with the second entity, via a payment processing network; wherein the transaction response message indicates whether or not the transfer of funds is approved.

In another embodiment of the invention, a first server computer comprising a processor and a non-transitory computer medium are described. The non-transitory computer readable medium comprises code executable by the processor to perform a method. The method comprises receiving, at a first server computer associated with a first entity, a set of data elements to withdraw funds from the first entity operating a mobile communication device from a communication via a communications network, wherein the set of data elements comprises an amount associated with the funds to be withdrawn. Then the first server computer derives a one-time temporary use account identifier and an associated one-time temporary use access code. The method further comprises the first server computer transmitting the one-time temporary use account identifier to the mobile communications device, and transmitting the one-time temporary access code to the mobile communications device in a separate message from the one-time temporary use account identifier. The first server computer then receives a transaction request message from a second server computer associated with a second entity, after the second entity has received entry of the one-time temporary account identifier and the associated one-time temporary use access code, via a payment processing network. The transaction request message comprises the amount, the one-time temporary account identifier, and the associated one-time temporary access code. The first server computer then transmits a transaction response message to the second server computer associated with the second entity, via a payment processing network; wherein the transaction response message indicates whether or not the transfer of funds is approved.

These and other embodiments of the invention are described in further detail below.

BRIEF DESCRIPTION OF THE DRAWINGS

FIG. 3 illustrates the operation of a user depositing money into his account using the system

FIG. 5 illustrates a message flow in the system for a transaction according to an embodiment of the present invention FIG. 6 is a flow diagram of a process for the transaction in FIG. 5 according to an embodiment of the present invention.

FIG. 7 illustrates a message flow in the system for a transaction according to an embodiment of the present invention.

FIG. 8 is a flow diagram of a process for the transaction in FIG. 7 according to an embodiment of the present invention.

FIG. 9 illustrates a message flow in the system for a transaction according to an embodiment of the present invention.

FIG. 10 is a flow diagram of a process for the transaction in FIG. 9 according to an embodiment of the present invention.

FIG. 11 illustrates a message flow in the system for a transaction according to an embodiment of the present invention.

FIG. 12 is a flow diagram of a process for the transaction in FIG. 11 according to an embodiment of the present invention.

FIGS. 13 and 14 illustrate a message flow in the system for a transaction according to an embodiment of the present invention.

FIGS. 15 and 16 are flow diagrams of a process for the transaction in FIGS. 13-14 according to an embodiment of the present invention.

FIG. 17A-1 illustrates an exemplary account number created upon opening an account according to an embodiment of the invention.

FIG. 17A-2 illustrates a destination account number calculated according to an embodiment of the invention.

DETAILED DESCRIPTION

Figure 1:
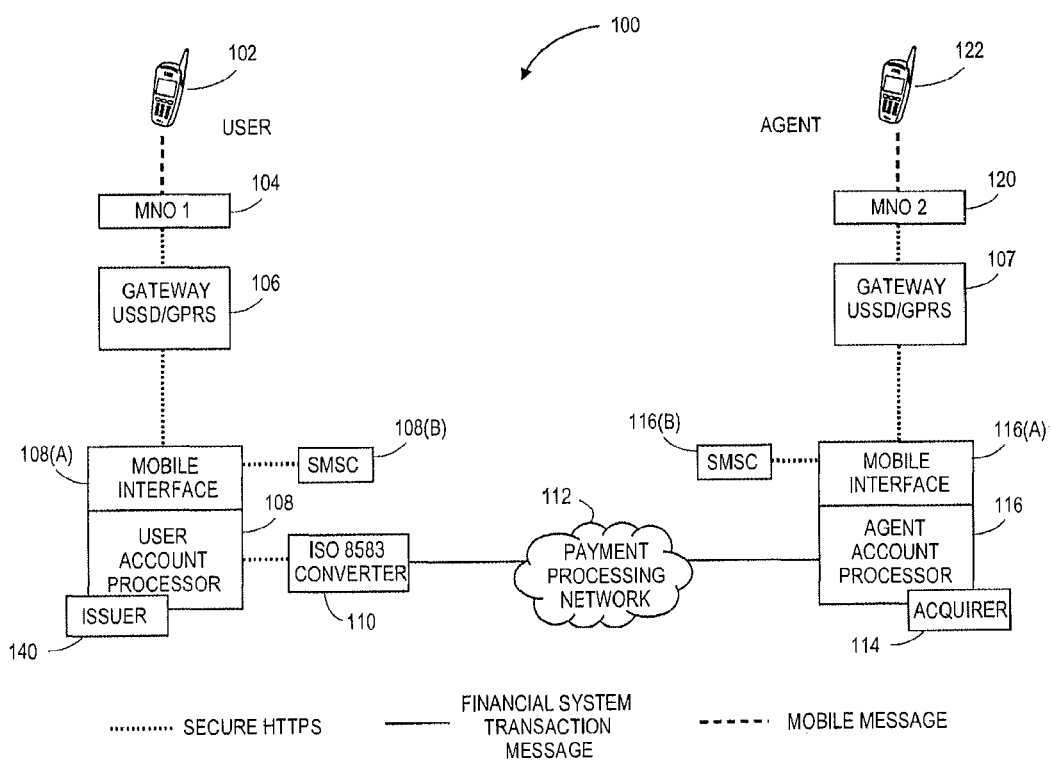
FIG. 1 illustrates a diagram of a system according to an embodiment of the present invention.

Embodiments of the present invention provide for systems and methods for performing traditional banking operations using existing mobile communication channels, and mobile communication devices, such as mobile phones. In some embodiments, a mobile phone can be used to deposit money into a user account, withdraw money from the user account, transfer money from one user to another, pay bills, and/or withdraw money from an automated teller machine (ATM), among other things, without the use of a traditional payments infrastructure (e.g., with wired lines to POS or point of service terminals via acquirer computers).

Further descriptions of some terms can be provided for a better understanding of embodiments of the invention.

A "first entity" and a "second entity" may be any suitable entities that can use the systems and methods according to embodiments of the invention. For example, in some embodiments, the "first entity" may be a user or and the "second entity" may be an agent of a bank (or vice-versa). An agent may be a merchant, an individual, a service provider, a bank, or a representative of one or more of these entities. For example, in one embodiment, an agent may be a person that is a representative of a bank A "first server computer" may be any suitable computer that is associated with the first entity. Examples of first server computers may include a user account processing server computer (alternatively referred to as a user account processor in some instances), an agent account processing server computer (alternatively referred to as an agent account processor in some instances), etc.

A "second server computer" may be any suitable computer that is associated with the second entity. Examples of second server computers may include a user account processing server computer (alternatively referred to as a user account processor in some instances), an agent account processing server computer (alternatively referred to as an agent account processor in some instances), etc.

The first server and second server computers can each be a powerful computer or a cluster of computers. For example, the first server computer can be a large mainframe, a minicomputer cluster, or a group of servers functioning as a unit. The first server computer may comprise a processor and a non-transitory computer readable medium comprising code executable by the processor to perform functions, such as generating messages, electronically receiving and transmitting messages/data, parsing messages/data, and using an algorithm to generate account numbers associated with the first entity. The second server computer could have similar features in other embodiments of the invention.

It is noted that the references to "first" and "second" are not intended to be limiting, and that embodiments of the invention may include third, fourth, etc., entities and computers, whether or not they are not explicitly described herein.

A "mobile communications device" may be any suitable device that can be easily transported from one location to another. Further, a mobile communications device may be in any suitable form. Examples of devices include cellular phones, PDAs, personal computers (PCs), tablets, and the like. Such devices can be hand-held, compact, mobile, and enabled to communicate over a communications network interface, such as Global System for Mobile Communications (GSM), and may have an associated device identifier (e.g., mobile phone number).

A "mobile communications device identifier" may be any suitable identifier to uniquely identify the mobile communications device. The identifier may be a string of predetermined length of numbers, letters, and/or combination of both. For example, a mobile communications device identifier may a string of numbers consisting 9 digits.

A "communications network" may include any form, medium, or method of electronically communicating and transmitting data using mobile communications devices. Examples of a communications network include the Internet, radio, and/or telecommunications network (e.g., GSM). The communications network may comprise hardware and software to operate a gateway to receive, transmit, and process various communication protocols, such as USSD (unstructured supplementary service data), or GPRS (general packet radio service).

"Data elements" may be any suitable data transmitted any suitable message or communication over the communications network, and data elements may be transmitted in the form of SMS (short messaging service) or other text messaging services used in mobile communications devices. Data elements according to embodiments of the invention may include a mobile communications device identifier, and an amount associated with a transfer of funds. In some embodiments, data elements may also include a user identifier, one-time generated personal account number (PAN), or one-time generated personal identification number (PIN). Other examples of data elements may comprise a mobile device identifier or a merchant ID, bill number, and/or biller ID. Data elements may include information that can be used to facilitate a transaction between the entities participating in a particular transaction.

A "transaction request message" may be any suitable message transmitted from the first entity to the second entity through a financial system transaction network, such as a payment processing network. A transaction request message may in the standard ISO 8583 messaging format, or in any other suitable financial system transaction messaging format. Suitable messages may be in an 0200 message format. In embodiments of the invention, a transaction request message may include a transaction type indicator, an amount associated with the transfer of funds from the first entity to the second entity, information identifying the first entity and a mobile communications device identifier associated with the second entity.

In some embodiments, the transaction request message can be an OCT (Original Credit Transaction) type message. An OCT transaction is typically a clearing and settlement credit transaction designed for use in business applications such as a business money transfer or business-to-consumer repayments. In some cases, the OCT carries only the account number of the recipient and no information about the sender. A special indicator identifies an OCT to the recipient of the message. OCT messages may also include an Electronic Commerce Indicator (ECI) to indicate an Internet OCTs (if appropriate).

A "transaction type indicator" may be any suitable indicator that determines a type of transaction. Examples of types of transactions include, deposit, withdrawal, bill pay, ATM withdrawal, and recipient transfer. In embodiments of the invention, the transaction indicator is generated at the first entity initiating the transfer of funds. For example, an agent (first entity) may initiate a transfer of funds to a user (second entity) by transmitting a transaction request message with a transaction indicator indicating the transfer of funds is a deposit transaction in which the user wishes to make a deposit at the agent.

Transaction type indicators may further take any suitable form, and may be in the form of letters, numbers, etc. For instance, a transaction type indicator could be "1" for a deposit transaction and "2" for a withdrawal transaction. The transaction type indicators could be placed in a transaction type indicator data field in a transaction request message.

A "transaction response message" may be any suitable message transmitted from the second entity to the first entity through a financial system transaction network, such as a payment processing network, in response to the transaction request message. A transaction response message may in the standard ISO 8583 messaging format, or in any other suitable financial system transaction messaging format. In embodiments of the invention, a transaction response message may include a transaction type indicator, an amount associated with the transfer of funds from the first entity to the second entity, a mobile communications device identifier associated with the second entity, and an indication that the transfer of funds was approved or not approved. It may also comprise other elements including a risk score, or information identifying the second entity.

A "payment processing network" may include data processing subsystems, networks, and operations used to support and deliver authorization services, exception file services, and clearing and settlement services. A payment processing network may be any suitable network able to transmit and receive financial system transaction messages (e.g., ISO 8583 messages), and process original credit and debit card transactions. An exemplary payment processing system may include VisaNet™. Payment processing systems such as VisaNet™ are able to process credit card transactions, debit card transactions, and other types of commercial transactions.

A "server computer" can be a powerful computer or a cluster of computers. For example, the server computer can be a large mainframe, a minicomputer cluster, or a group of servers functioning as a unit. A server computer may comprise a processor and a non-transitory computer readable medium. The non-transitory computer readable medium may comprise code executable by the processor to perform methods, program functions, and algorithms. A server computer may also comprise hardware and software enabling over communications networks, such as the Internet, intranet, and/or telecommunications networks.

System Overview

In embodiments of the invention, a user may wish to conduct a transaction with another user (e.g., an agent) using the user's mobile communications device. The transaction may be a deposit, a withdrawal, a payment for a bill, a transfer to another user, and/or a payment other user. The other user could be an agent, which may be a representative of a bank, merchant, etc. In some cases, the user's mobile communications device may transmit and receive messages to various participants and computers in the system via a mobile network operator (MNO).

FIG. 1 is illustrates a system 100 for performing financial transactions according to an embodiment of the present invention. The system 100 includes a user mobile communications device 102, an agent mobile communications device 122, and their respective mobile network operators (MNO1 104 providing communications services to the user, and MNO2 120 providing communications services to the agent). The MNOs may include an unstructured supplementary services data (USSD) or general radio packet service (GPRS) gateway 106. MNOs 104, 120 may be embodied by any suitable communications or computer systems that can facilitate the functions of traditional mobile network operators. The system 100 may also include a user account processor 108 in communication with the user mobile communications device 102 via the MNO1 104 and Gateway 106. The user account processor 108 may also include a mobile interface 108(*a*) and a SMS center 108(*b*) (SMSC) to generate SMS messages to and from the user mobile communications device 102.

Similarly for the agent mobile communications device 122, there is an associated agent account processor 116. The agent account processor 116 may include a mobile interface 116(*a*) and a SMS center 116(*b*) (SMSC) to generate, receive, and transmit SMS messages to and from the agent mobile communications device 122 via MNO2 120, providing communications services to the agent mobile communications device 122. The MNO2 120 may also include a USSD/GPRS Gateway 107. As can be seen in FIG. 1, the user mobile communications device 102 and the agent mobile communications device 122 communicate with MNO1 104 and MNO2 120, respectively, using mobile messages, such as SMS. In other embodiments, other communication mechanisms such as e-mail may be used. MNO1 104, gateway 106, mobile interface 108(*a*) and SMSC 108(*b*) of the user account processor 108 communicate using secure hypertext transfer protocol secure (https), for example, via the Internet (not shown). Other communication protocols may be used in other embodiments of the invention.

Consumer mobile communications device 102 and agent mobile communications device 122 can be any mobile communication device capable of sending and receiving data via a wireless medium. Examples of consumer mobile device 102 and agent mobile device 122 may include a mobile phone, a PDA, a tablet, a portable computer, or the like. MNOs 104 and 120 can each be an entity that enables the use of consumer mobile device 102 and agent mobile device 122 by providing communications services. In some embodiments, MNOs 104 and 120 can be mobile phone operators such as AT&T, Verizon, etc. In some embodiments, MNO1 104 may be same as MNO2 120. In other embodiments, MNO1 104 may be different from MNO2 120.

USSD gateway 106 may be a central point at which several different protocols or communications signals are controlled and routed based upon several different parameters. USSD gateway 106 may route USSD messages from the signaling (MNO) network to service applications and back. An USSD is a session-based protocol; therefore, a session needs to be allocated to each and every interaction. USSD is a protocol used by GSM (Global System for Mobile Communication) cellular telephones to communicate with the service provider's computers. In some embodiments, USSD can be modified for use with mobile devices using the CDMA (Code Division Multiple Access) technology. USSD messages are typically up to 182 alphanumeric characters in length. Unlike Short Message Service (SMS) messages, USSD messages create a real-time connection during a USSD session. The connection remains open, allowing a two-way exchange of a sequence of data using menu based interface. This makes the USSD more responsive and user friendly than services that use only SMS messages. A typical USSD session begins by dialing an asterisk (*) followed by digits that comprise commands or data. Groups of digits may be separated by additional asterisks. The message is terminated with the number sign (#).

The user account processor 108 and the agent account processor 116 may communicate via a payment processing network 112. In some embodiments, there may be an optional ISO 8583 converter 110, which processes ISO 8583 messages, which are a standard form of financial system transaction message typically used in payment processing networks 112, such as VisaNet. Although an ISO 8583 converter 110 is shown, any suitable data converter that converts data from a data in a non-financial transaction message format (e.g., an e-mail format) into a financial transaction message format (e.g., an ISO 8583 message) can be used.

User account processor server computer 108 can be configured to process transactions for users' accounts. User account processor server computer 108 can include information about multiple users and their respective mobile communications devices. In some embodiments, user account processor server computer 108 may include a non-transitory computer readable medium that includes instructions for operating a processor to cause the processor to generate transaction request message based on data elements received from user mobile communications device 102. The agent account processor server computer 116 may then generate a transaction response message in response to the transaction request message. In another embodiment, the agent account processor server computer 116 may generate a transaction request message based on data elements received from agent mobile communications device 122, and the user account processor server computer 108 may generate a transaction response message.

As part of the registration process to use mobile banking system 100, a user (alternatively referred to as a consumer in some instances) may be asked to register his mobile device and associated information with consumer account processor server computer 108. The user may be issued a unique identifier (user ID). The user ID can be 6-10 characters in length and may include alphanumeric and/or special characters. In some embodiments, user account processor server computer 108 may also receive an agent ID and the agent's mobile communications device identifier in a SMS message or other mobile message from the user mobile communications device 102 and generate a transaction request message based on the agent ID and the agent's mobile number. In some embodiments, user account processor server computer 108 may communicate with the mobile interface 108(*a*) and SMSC 108(*b*) to send a communication, e.g., an SMS message, to user mobile device 102 via MNO1 104. In some embodiments, user account processor server computer 108 and payment processing network server computer 112 can be a single entity, or may be separate.

In some embodiments, the user account processor server computer 108 may be enabled to generate a one-time PAN (primary account number) based on data elements received from the user mobile communications device 102. User account processor server computer 108 may use these inputs and apply an algorithm to generate a one-time PAN. The one-time PAN can be dynamically generated for one time use only.

Payment processing network server computer 112, e.g., VisaNet, may be configured to process payment transactions for the benefit of either the consumer or the agent. The payment processing network server computer 112 may be enabled to process original credit and debit transactions. In some embodiments, user account processor server computer 108 and/or agent account processor server computer 116 may be part of payment processing network server computer 112.

Agent account processor server computer 116 may be similar in many aspects to user account processor server computer 108 with certain differences, since it is associated with the agent. Agent account processor server computer 116 may include a non-transitory computer readable medium that includes instructions for generating transaction request messages and transaction response messages. It may also include instructions, executable by a processor, for performing any of the previously described functions, as well as other functions. In some embodiments, agent account processor server computer 116 can be part of payment processing network server computer 112.

The account processor server computer 108 (user) or 116 (agent) is typically utilized or owned by an issuer 140 or an acquirer 114, which is any financial institution or payment services provider that can legally offer financial services such as transactional/checking/savings/loan account, bill pay, money transfer, debit and credit card services, etc. Alternatively, either the issuer 140 or acquirer 114 may be optional.

Although system 100 is illustrated as including certain components, one skilled in the art will realize that other components in addition to or in lieu of the illustrated components may be used depending on the application and desired results.

Figure 2:
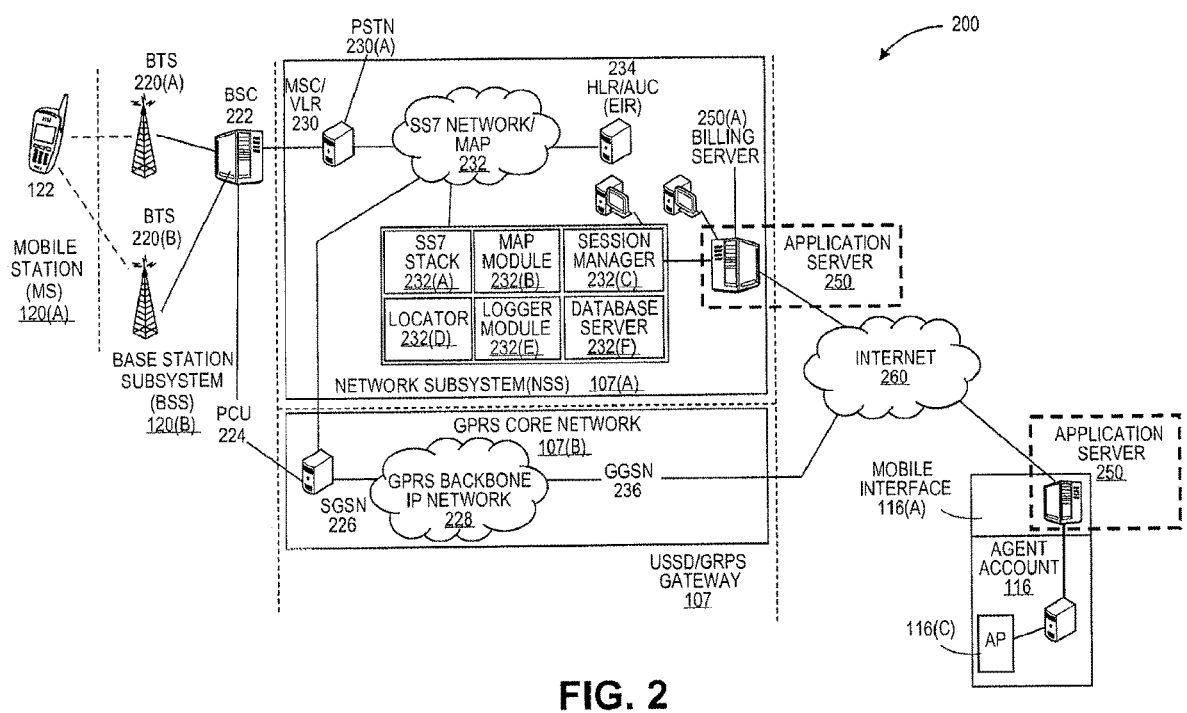
FIG. 2 illustrates a diagram of a network system according to an embodiment of the present invention.

FIG. 2 illustrates, in greater detail, a network system 200 coupling, for example, an agent mobile communications device 122 with an agent account processor server computer 116 through the MNO2 120 and USSD/GPRS Gateway 107 of FIG. 1. A Mobile Station (MS) 120(a) may include an agent mobile communications device 122, or any equipment or software needed to communicate with a mobile communications network operated by a Mobile Network Operator (MNO2 120). The Mobile Network operator (MNO2 120) may include a Base Station Subsystem (BSS) 120(b). The BSS is a section of a traditional mobile telephone network which is responsible for handling traffic and signaling between a mobile communications device and the network switching subsystem. The BSS 120(b) may carry out transcoding of speech channels, allocation of radio channels to mobile communication devices, paging, transmission and reception over the air interface, and many other tasks related to radio networks and other communications networks. The BSS 120(b) may comprise Base Transceiver Stations 220(a) and 220(b), or BTS, which contains the equipment for transmitting and receiving radio signals (transceivers), antennas, and equipment for encrypting and decrypting communications with the base station controller (BSC). For example, the BTS 220(a) and 220(b) may be towers scattered through a region to provide mobile communications service coverage over the region over several different frequencies.

BTS 220(a) and 220(b) are controlled by a parent Base Station Controller (BSC) 222. The base station controller (BSC) provides the intelligence behind the BTSs. Typically, a BSC has tens or even hundreds of BTSs under its control. The BSC handles allocation of radio channels, receives measurements from the mobile communication devices, and controls handovers from BTS 220(a) to BTS 220(b) (except in the case of an inter-BSC handover in which case control is in part the responsibility of the anchor Mobile Switching Center 230). A function of the BSC is to act as a concentrator where many different low capacity connections to BTSs (with relatively low utilization) become reduced to a smaller number of connections towards the Mobile Switching Center (MSC) 230 (with a high level of utilization). Overall, this means that networks are often structured to have many BSCs 222 distributed into regions near their BTSs 220(a) and 220(b) which are then connected to large centralized MSC sites 230 in the Network Sub-System (NSS) 107(a) in the USSD/GPRS Gateway 107.

For GPRS (general radio packet service), the BSC 222 may be coupled to a Packet Control Unit (PCU) 224. The PCU 224 performs some of the processing tasks of the BSC 222, but for radio packet data. The allocation of channels between voice and data is controlled by the BSS 120(b), but once a channel is allocated to the PCU, the PCU takes full control over that channel. The PCU can be built into the BSS, built into the BSC, or even, in some proposed architectures, it can be at the SGSN (Serving GPRS Support Node) site 226. In most cases, the PCU 224 is a separate node communicating extensively with the BSC 222 on the radio side and the SGSN 226 on the GPRS core network 106(b) side in the USSD/GPRS Gateway 106.

The Network SubSystem (NSS) 107(a) processes USSD protocol in standard GSM operation. The Mobile Switching Center 230 may also include a Visitor Locator Register (VLR), which locates another subscriber's mobile communication device connecting through a Mobile Network Operator's BTS (e.g., tower). For example, the VLR would locate the location of a Verizon user if the Verizon user was connecting to an AT&T tower. An extension of the Mobile Switching Center 230 may also include a Public Switched Telephone Network (PSTN) 230(a), which is a network of the world's public circuit-switched telephone networks. It consists of telephone lines, fiber optic cables, microwave transmission links, cellular networks, communications satellites, and undersea telephone cables, all inter-connected by switching centers, thus allowing any telephone in the world to communicate with any other. Originally a network of fixed-line analog telephone systems, the PSTN 230(a) is now almost entirely digital in its core and includes mobile as well as fixed telephones.

The MSC/VLR 230 may be in communication with a SS7 Network/MAP 232. Signaling System No. 7 (SS7) is a set of telephony signaling protocols which are used to set up most of the world's public switched telephone network telephone calls. The main purpose is to set up and tear down telephone calls. Other uses include number translation, local number portability, prepaid billing mechanisms, short message service (SMS), and a variety of other mass market messaging and communications services. The SS7 Network may also include a Mobile Application Part (MAP), which is an SS7 protocol which provides an application layer for the various nodes in GSM and UMTS mobile core networks and GPRS core networks to communicate with each other in order to provide services to mobile phone users.

The Mobile Application Part (MAP) 232 is the application-layer protocol used to access the Home Location Register (HLR) 234, Visitor Location Register (VLR) and Mobile Switching Center (MSC) 230, Equipment Identity Register (EIR) 234, Authentication Centre (AUC) 234, Short message service center and Serving GPRS Support Node (SGSN) 226. The Home Location Register (HLR) 234, in conjunction with the EIR and AUC (also in 234), would locate and identify a user mobile communication device, for example, detecting and identifying an AT&T user connecting to an AT&T BTS (e.g., tower).

To perform the tasks and communicate with the entities described above, the SS7 Network/MAP 232, or the USSD Gateway Network Sub-System (NSS) 107(a), may include a SS7 stack 232(a), a MAP module 232(b), a Session Manager 232(c), a Locator Module 232(d), a Logger Module 232(e), and a Database Server 232(f). Certain data elements transmitted in mobile messages (e.g., SMS, USSD) may be stored in the Logger Module 232(e) and the Database Server 232(f). Thus, anyone within the MNO2 120 with access to the USSD Gateway 107, specifically the NSS 107(a), may have access to messages, and in turn, stored data elements transmitted in the messages and logged in the gateway. However, there are controls to reduce the potential of data elements from SMS messages being comprised. Examples of such security controls include, but are not limited to, access to an associated SIM (Subscriber Identity Module), limits on transaction size or frequency, etc.

The USSD/GPRS Gateway 107 may also include a GPRS core network 106(b). The GPRS core network 107(b) is a central part of the General Packet Radio Service which allows 2G, 3G, and WCDMA (wideband CDMA) mobile networks to transmit IP packets to external networks such as the Internet. The GPRS core network 107(b) can be an integrated part of the GSM network switching subsystem, and includes a network of GPRS support nodes (GSN). A GSN is a network node which supports the use of GPRS in the GSM core network. There can be two GSNs, namely Gateway GPRS Support Node (GGSN) 236 and Serving GPRS Support Node 226, which are communicatively connected by a GPRS backbone IP Network 228.

The Gateway GPRS Support Node (GGSN) 236 can be a main component GPRS code network 107(b). The GGSN 236 is responsible for the interworking and routing between the GPRS IP network 228 and external packet switched networks, like the Internet 260 and other communications networks. From an external network's point of view, the GGSN 236 is a router to a sub-network GPRS backbone IP Network 228. When the GGSN 236 receives data addressed to a specific user, it checks if the user is active. If it is, the GGSN 236 forwards the data to the Serving GPRS Support Node (SGSN) 226 serving the mobile user through the GPRS backbone IP Network 228, but if the mobile user is inactive, the data is discarded. On the other hand, mobile-originated packets from the SGSN 226, through the GPRS backbone IP Network 228, are routed by the GGSN 236 to the right external network, such as the Internet 260. The GGSN 236 is the anchor point that enables the mobility of the user terminal in the GPRS IP networks 228 to connect to an external network, such as the Internet 260.

Serving GPRS Support Node (SGSN) 226 can be responsible for the delivery of data packets from and to the mobile stations 120(a) within a geographical service area. Its tasks include packet routing and transfer, mobility management (attach/detach and location management), logical link management, and authentication and charging functions. The location register of the SGSN 226 stores location information (e.g., current VLR), and user profiles (e.g., IMSI, address(es) used in the packet data network) of all GPRS users registered with the SGSN 226.

The USSD/GPRS Gateway 106 may be in communication with an Application Server 250. The Application Server may be operated on the Agent Account Processor Server Computer 116, or may be included in the USSD/GPRS Gateway 107. The Application Server may include a Billing Server 250(a). Some MNO's do not have their USSD Gateway connected to the Billing Server 250(a), however with the rise in conducting transactions using mobile communication devices, USSD Gateways may now be connected to the billing sever 250(a) operated on the application server 250.

The Agent Account Processor Server computer 116 may include an agent account mobile interface 116(a) and an access point 116(c). The agent account processor server computer 116 may also include an application server 250. Agent account processor server computer 116 may include a non-transitory computer readable medium that includes instructions for generating transaction request messages and transaction response messages. In some embodiments, agent account processor server computer 116 can be part of payment processing network server computer 112. The Agent Account Processor Server computer 116 may also include an Access Point (AP) 116(c), which provides access to a payment processing network.

Exemplary Methods

A number of exemplary methods can now be described. It is to be noted that the message flows illustrated below are for particular embodiments, and that these transaction flows are for illustrative purposes only and in no way should be construed to limit the invention to the disclosed transaction flows. One skilled in the art will realize that system 100 can be used to perform several additional operations not specifically disclosed herein. Also, alternative embodiments of the present invention may perform the steps outlined above in a different order and may omit steps or add more steps without departing from embodiments of the invention. One of ordinary skill in the art would recognize many variations, modifications, and alternatives.

Deposit Transaction

Figure 3:
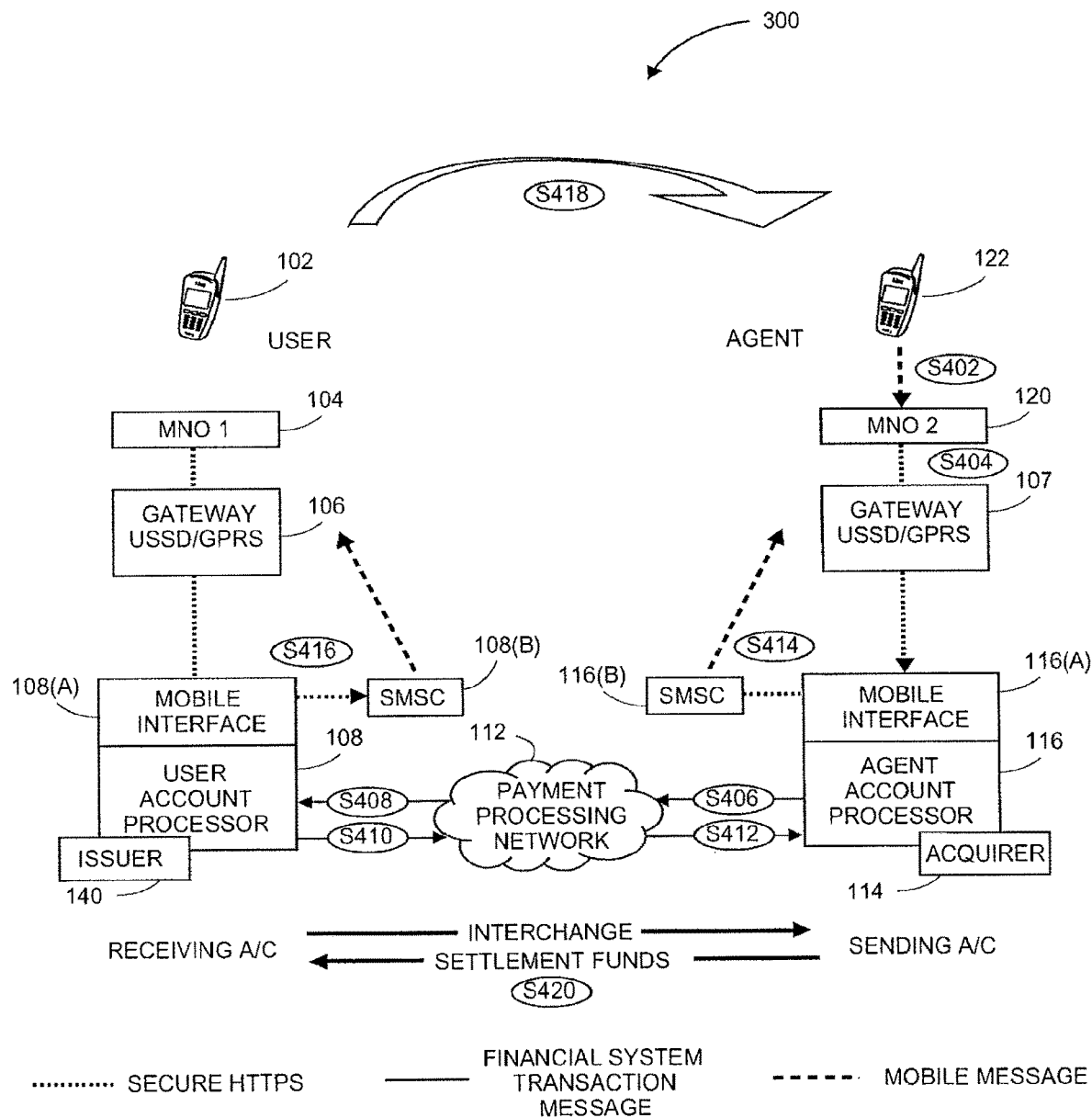
FIG. 3 illustrates diagram of a system a message flow in the system for a transaction according to an embodiment of the present invention.
Figure 4:
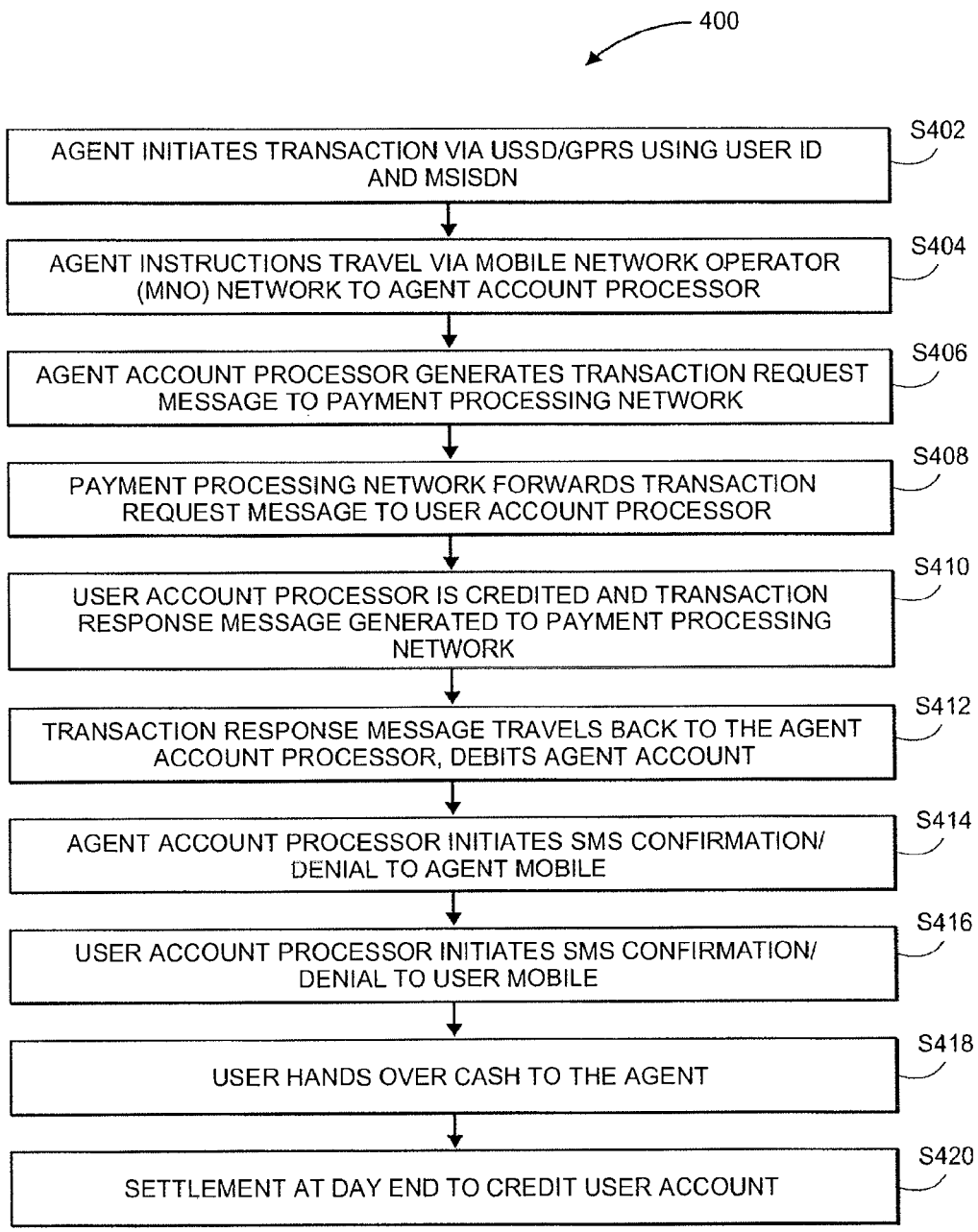
FIG. 4 is flow diagram of a process for the transaction in FIG. 3 according to an embodiment of the present invention.

According to an embodiment of the invention, instead of traveling to a bank branch in a remote region to deposit funds into a user account, a user may wish to use his user mobile communication device to deposit funds into his user account by conducting the transaction with a local agent, such as a business within his town. FIG. 3 illustrates a system overview in conjunction with FIG. 4 illustrating an exemplary message flow between the various entities of system 300 according to an embodiment of the present invention. The embodiment illustrated in FIGS. 3 and 4 illustrates the operation of a user depositing money into his account using the mobile banking system 100 illustrated in FIG. 1 (corresponding to system 300 of FIG. 3).

When a user desires to deposit money (e.g., $10) into his account, using a user mobile communications device 102, the user (an example of a second entity) approaches an agent (an example of a first entity) with an agent mobile communications device 122. In step S402 of FIG. 4, the agent initiates a transaction via MNO2 120 by sending a communication (e.g., SMS) including (1) an amount to be deposited, (2) the user's ID, and (3) the user's mobile communications device identifier (e.g., MSISDN). In step S404, the agent instructions travel via the MNO2 120 network and USSD/GPRS Gateway 107 to the agent account processor server computer 116 (an example of a first server computer), and is processed by an application server (250 in FIG. 2) operating on the agent account processor server computer 116. The communication is received by the agent account processor server computer 116 can be a secure https message (e.g., via the Internet).

In step S406, the agent account processor server computer 116 then generates a transaction request message and transmits it to payment processing network 112, which will eventually forward it to the user account processor server computer 108. The transaction request message comprises a transaction type indicator indicating that the transaction is a deposit transaction, an amount associated with the transfer of funds (e.g., $10), and a mobile communications device identifier (e.g., a mobile phone number) associated with the mobile device 102 used by the user. The transaction request message may comprise a PAN (primary account number) comprising at least one (and preferably all) of an identifier for the recipient of the authorization request message (which may be a six digit number that is similar to a BIN or bank identification number), the transaction type indicator, and the mobile communications device identifier of the second identity (or a second entity identifier), as well as an optional check digit. The transaction request message may be properly formatted and transmitted as a secure financial system transaction message. In embodiments of the invention, the transaction may be forwarded as SMS OC (single message service open connectivity) or Base 1 OC (Base 1 open connectivity) depending on the access point (AP, referring to 116(c) in FIG. 2) connectivity in the agent account processor server computer 116. It may also be formatted as an ISO 8583 type financial transaction message.

Once the transaction request message is received at the payment processing network 112, a central server computer in the payment processing network 112 may then route the transaction request message to the appropriate downstream server computer. Thus, the method may further comprise receiving, from the agent account processor server computer 116 at a central server computer (not shown) in the payment processing network 112, the transaction request to transfer funds from the first entity (e.g., the agent) to a second entity (e.g., the user). The transaction request comprises a transaction type indicator, an amount associated with the transfer of funds, and a mobile communications device identifier used by the second entity. The central server computer then parses the transaction request message, determines a second server computer (e.g., the user account processor computer 108) associated with the second entity (e.g., the user), and transmits the transaction request message to the second server computer.

In step S408, once the central server computer in the payment processing network 112 determines that the user account processing server computer 108 is the intended recipient, the payment processing network 112 forwards the transaction request message to the user account processor server computer 108.

In step S410, the user account is credited, and a transaction response message, which confirms or denies the transaction, is generated by the user account processor server computer 108, and is then transmitted to the payment processing network 112. The central server computer in the payment processing network may then receive the transaction response message from the second server computer (e.g., the user account processor server computer), parse the transaction response message, and determine the first server computer (e.g., the agent account processor server computer). The central server computer then transmits the transaction response message to the first server computer.

In step S412, the transaction response message confirming/denying the transaction travels back to the agent account processor server computer 116, and debits the agent's account for the confirmed amount. The transaction response message may comprise various pieces of information such as at least one of the approved transaction amount, an indication that the transaction was approved or not approved, an indication that the transaction was partially approved, an identifier of the agent (or his mobile device), an identifier for the user (or his mobile device), etc.

Then in step S414, the agent account processor server computer 116 initiates a SMS message, through agent account SMS center 116(*b*), forwarding the confirmation/denial of the transaction to the agent mobile communication device 122. Also, in step S416, the user account processor server computer initiates a SMS message, through user account SMS center 108(*b*), forwarding the confirmation/denial of the transaction to the user mobile communications device 102.

To complete the transaction, in step S418, the user hands cash equivalent to the amount credited to the user account and debited by the agent account to the agent.

In step S420, an interchange, and clearing and settlement can be performed by the payment processing network 112. This can be done at the end of the day or at any other suitable time period in order to transfer the appropriate funds from the agent's account to the user's account.

Withdrawal

Figure 5:
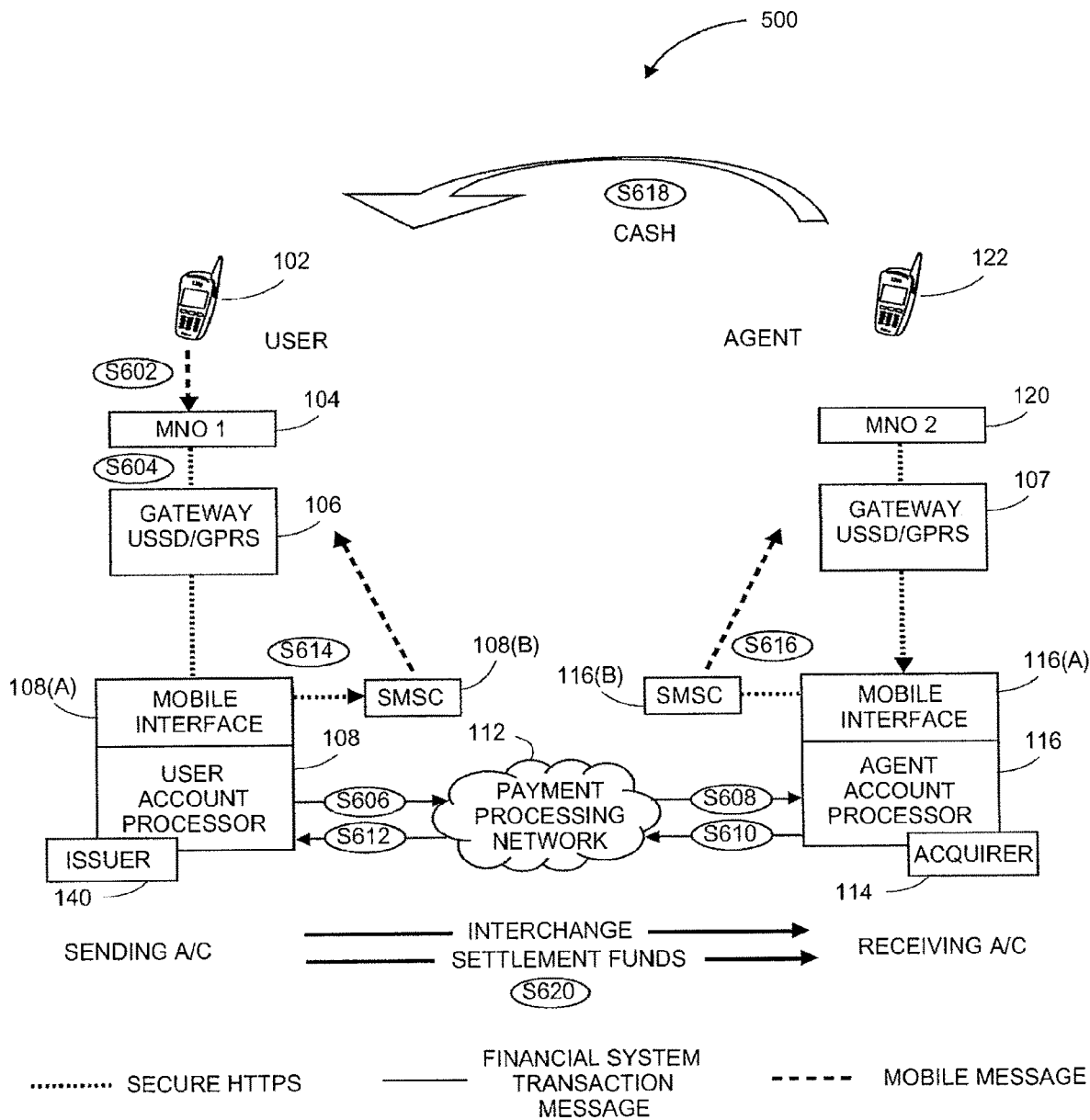
FIGS. 5 and 6 illustrate the operation of a user withdrawing money from his account using the mobile banking system.
Figure 6:
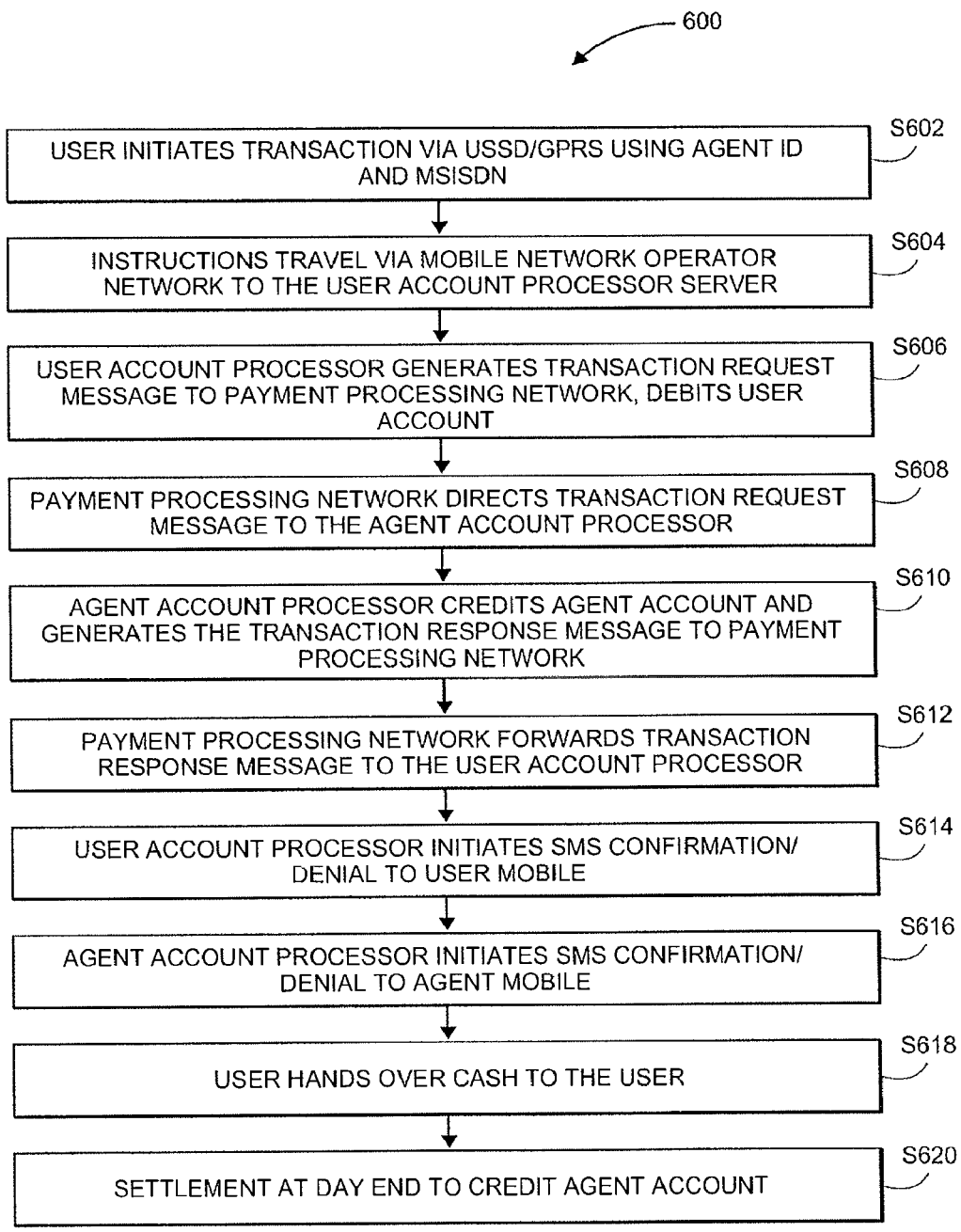

In another exemplary embodiment, the user may wish to withdraw money from an agent, such as a local business, instead of traveling to a remote bank branch to withdraw money. FIG. 5 illustrates a system overview in conjunction with FIG. 6 illustrating an exemplary message flow between the various entities of system 500 according to another embodiment of the present invention. The embodiment illustrated in FIGS. 5 and 6 illustrates the operation of a user withdrawing money from his account using the mobile banking system 100 illustrated in FIG. 1 (corresponding to system 500 of FIG. 5).

When a user (an example of a first entity in this embodiment) desires to withdraw money from his account, using a user mobile communications device 102, the user approaches an agent (an example of a second entity in this embodiment) with an agent mobile communications device 122, and in step S602 of FIG. 6, the user initiates a transaction via MNO1 104 by sending a communication (e.g., SMS), using the user mobile communications device 102, including (1) an amount to be withdrawn, (2) the agent's ID, and (3) the agent's mobile communications device identifier (e.g., MSISDN).

In step S604, the user instructions travel via the MNO1 104 network and USSD/GPRS Gateway 106 to the user Account Processor server computer 108, and may be processed by a mobile interface 108(*a*) operating on the user Account processor server computer 108. The communication is received by the user account processor server computer 108 as a secure https message (e.g., via the Internet).

In step S606, the user Account Processor server computer 108 (e.g., which may be an example of a first server computer in this embodiment) then generates and transmits a transaction request message to a payment processing network 112, and debits the user account. The transaction request message comprises a transaction type indicator indicating that the transaction is a withdrawal transaction, an amount associated with the withdrawal funds (e.g., $100), and a mobile communications device identifier (e.g., a mobile phone number) associated with the mobile device 122 used by the user. The transaction request message may be properly formatted and transmitted as a secure financial system transaction message. The transaction request message may comprise a PAN (primary account number) comprising at least one (and preferably all) of an identifier for the recipient of the authorization request message (which may be a six digit number that is similar to a BIN or bank identification number), the transaction type indicator, and the mobile communications device identifier of the second identity (or a second entity identifier), as well as an optional check digit. In embodiments of the invention, the transaction may be forwarded as SMS OC (single message service open connectivity) or Base 1 OC (Base 1 open connectivity). It may also be formatted as an ISO 8583 type financial transaction message.

Once the transaction request message is received at the payment processing network 112, a central server computer in the payment processing network 112 may then route the transaction request message to the appropriate downstream server computer. Thus, the method may further comprise receiving, from the user account processor server computer 108 at a central server computer (not shown) in the payment processing network 112, the transaction request to transfer funds from the first entity (e.g., the user) to a second entity (e.g., the agent). The transaction request comprises a transaction type indicator, an amount associated with the transfer of funds, and a mobile communications device identifier used by the second entity. The central server computer then parses the transaction request message, determines a second server computer (e.g., the agent account processor computer 108) associated with the second entity (e.g., the agent), and transmits the transaction request message to the second server computer.

In step S608, the payment processing network 112 then forwards the transaction request message to the agent account processor server computer 116. The transaction request message may be transmitted via a secure financial system transaction message.

In step S610, the agent account is credited, and a transaction response message, which confirms or denies the transaction, is initiated to the payment processing network 112. The central server computer in the payment processing network may then receive the transaction response message from the second server computer (e.g., the agent account processor server computer), parse the transaction response message, and determine the first server computer (e.g., the user account processor server computer).

The central server computer then transmits the transaction response message to the first server computer. For example, as shown in step S612, the payment processing network 112 forwards the transaction response message confirming/denying the transaction back to the user account processor server computer 108. The transaction response message may comprise various pieces of information such as at least one of the approved transaction amount, an indication that the transaction was approved or not approved, an indication that the transaction was partially approved, an identifier of the entities involved (or their mobile devices).

Then in step S614, the user account processor server computer 108 initiates a SMS message, through user SMS center 108(b), forwarding the confirmation/denial of the transaction to the user mobile communication device 102. Also, in step S616, the agent account processor server computer 116 initiates a SMS message, through agent SMS center 116(b), forwarding the confirmation/denial of the transaction to the agent mobile communications device 122.

To complete the transaction, in step S618, the agent hands cash equivalent to the amount withdrawn from the user account and credited to the agent account to the user.

In step S620, an interchange, and clearing and settlement can be performed by the payment processing network 112. This can be done at the end of the day or at any other suitable time period in order to transfer the appropriate funds from the user's account to the agent's account.

Money Transfer to a Recipient User

Figure 7:
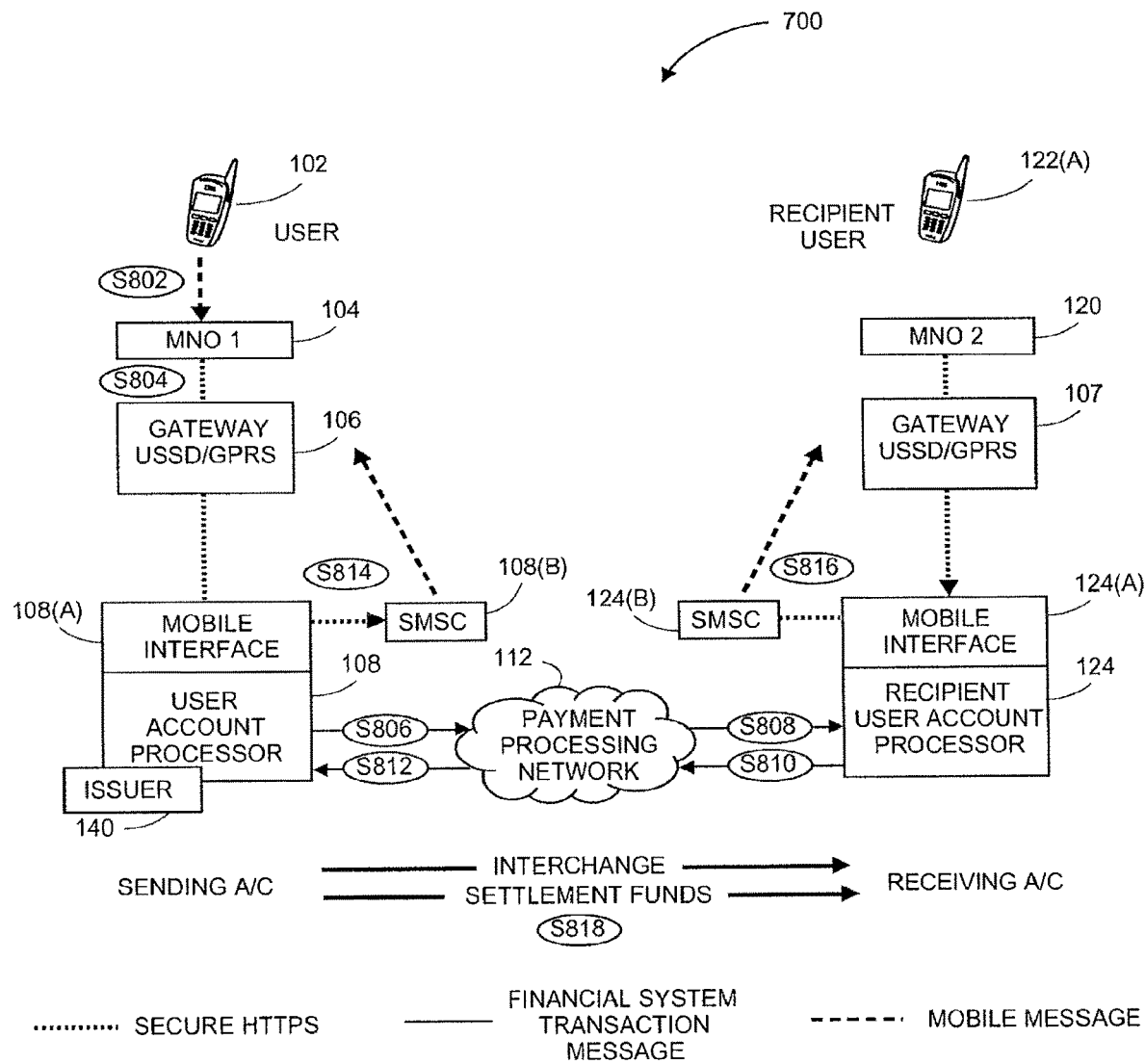
FIGS. 7 and 8 illustrate the operation of a user transferring money to a recipient user using a system according to an embodiment of the invention.
Figure 8:
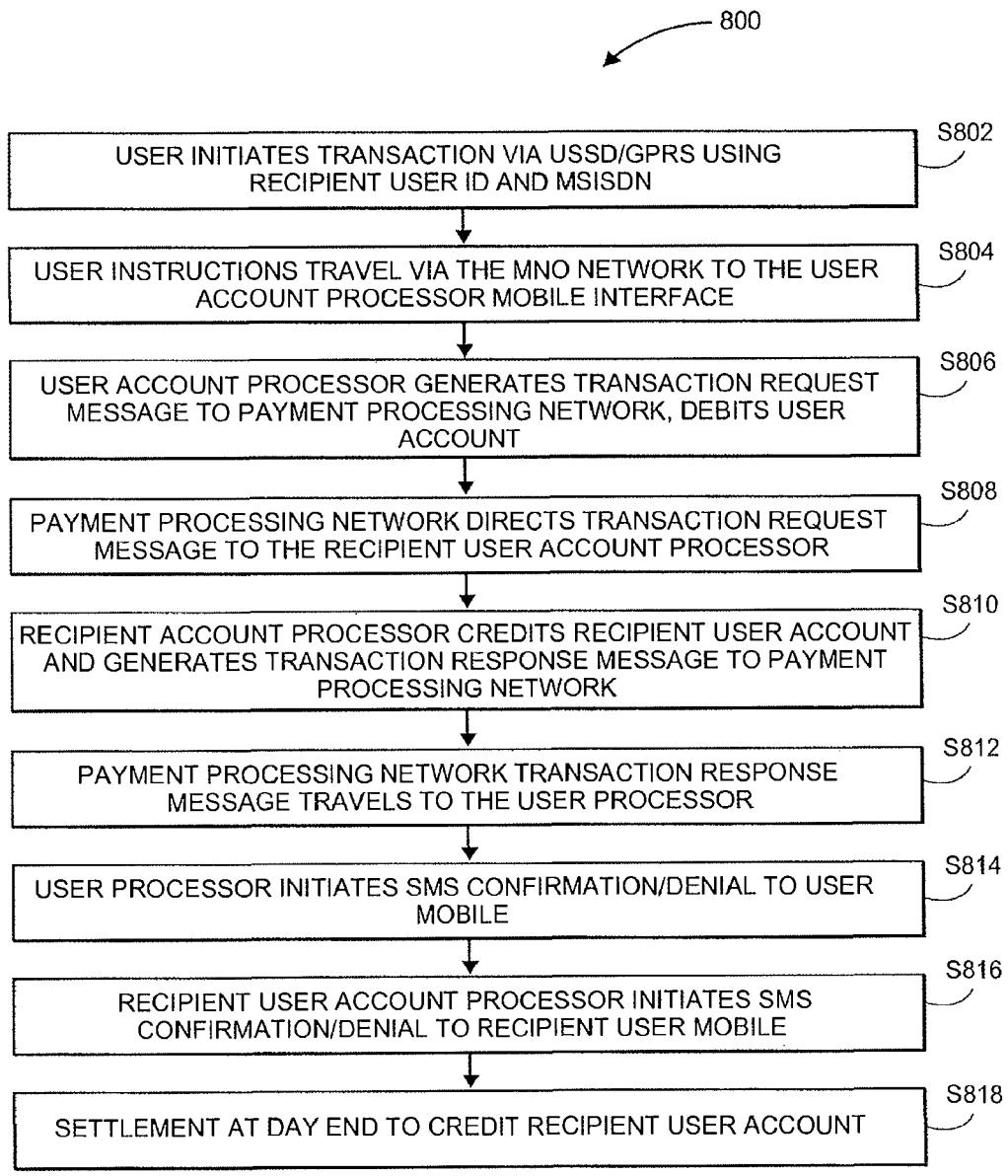

In another exemplary embodiment, the user may wish to transfer money to a recipient user in another location, instead of traveling to the recipient user's location, or having the money insecurely delivered to the recipient. FIG. 7 illustrates a system overview in conjunction with FIG. 8 illustrating an exemplary message flow between the various entities of system 700 according to another embodiment of the present invention. The embodiment illustrated in FIGS. 7 and 8 illustrates the operation of a user transferring money to a recipient user using the mobile banking system 100 illustrated in FIG. 1 (corresponding to system 700 of FIG. 7).

When a user desires to transfer money from his account, using a user mobile communications device 102, to a recipient user with a recipient mobile communications device 122(a), in step S802 of FIG. 8, the user initiates a transaction via MNO1 104 by sending a communication (e.g., SMS) via the user mobile communications device 102 including (1) an amount to be transferred, (2) the recipient's ID, and (3) the recipient's mobile communications device identifier (e.g., MSISDN) associated with recipient mobile communications device 122(a).

In step S804, the user instructions travel via the MNO1 104 network and USSD/GPRS Gateway 106 to the user account processor server computer 108, and may be processed by a mobile interface 108(a) operating on the user account processor server computer 108. The communication is received by the user account processor server computer 108 as a secure https message (e.g., via the Internet).

In step S806, the user Account Processor server computer 108 then generates and transmits a transaction request message to a payment processing network 112, and debits the user's account. The transaction request message comprises a transaction type indicator indicating that the transaction is a money transfer transaction, an amount associated with the transfer of funds (e.g., $50), and a mobile communications device identifier (e.g., a mobile phone number) associated with the mobile device 102 used by the recipient user. The transaction request message may be properly formatted and transmitted as a secure financial system transaction message. The transaction request message may comprise a PAN (primary account number) comprising at least one (and preferably all) of an identifier for the recipient of the authorization request message (which may be a six digit number that is similar to a BIN or bank identification number), the transaction type indicator, and the mobile communications device identifier of the second identity (or a second entity identifier), as well as an optional check digit. In embodiments of the invention, the transaction may be forwarded as SMS OC (single message service open connectivity) or Base 1 OC (Base 1 open connectivity. It may also be formatted as an ISO 8583 type financial transaction message.

Once the transaction request message is received at the payment processing network 112, a central server computer in the payment processing network 112 may then route the transaction request message to the appropriate downstream server computer. Thus, the method may further comprise receiving, from the user account processor server computer 108 at a central server computer (not shown) in the payment processing network 112, the transaction request to transfer funds from the first entity (e.g., the user) to a second entity (e.g., the recipient user). The transaction request comprises a transaction type indicator, an amount associated with the transfer of funds, and a mobile communications device identifier used by the second entity. The central server computer then parses the transaction request message, determines a second server computer (e.g., the recipient user account processor computer 108) associated with the second entity (e.g., the recipient), and transmits the transaction request message to the second server computer.

In step S808, the payment processing network 112 forwards the transaction request message to the recipient account processor server computer 124. The transaction request message may be transmitted via a secure financial system transaction message.

In step S810, the recipient account is credited, and a transaction response message, which confirms or denies the transaction, is generated and transmitted by the recipient account processor server computer to the payment processing network 112. The transaction response message may comprise various pieces of information such as at least one of the approved transaction amount, an indication that the transaction was approved or not approved, an indication that the transaction was partially approved, and identifiers for the entities (or their mobile devices) involved in the transaction.

The central server computer in the payment processing network may then receive the transaction response message from the second server computer (e.g., the user account processor server computer), parse the transaction response message, and determine the first server computer (e.g., the agent account processor server computer). The central server computer then transmits the transaction response message to the first server computer. For example, in step S812, the payment processing network 112 forwards the transaction response message confirming/denying the transaction back to the user account processor server computer 108.

Then in step S814, the user account processor server computer 108 initiates a SMS message, through the SMSC 108(*b*), forwarding the confirmation/denial of the transaction to the user mobile communication device 102. Also, in step S816, the recipient account processor server computer 124 initiates a SMS message, through the SMSC 124(*b*), forwarding the confirmation/denial of the transaction to the recipient mobile communications device 122(*a*).

To complete the transaction, in step S818, an interchange, and clearing and settlement can be performed by the payment processing network 112. This can be done at the end of the day or at any other suitable time period in order to transfer the appropriate funds from the user's account to the recipient user's account.

Remote Payment Transaction

Figure 9:
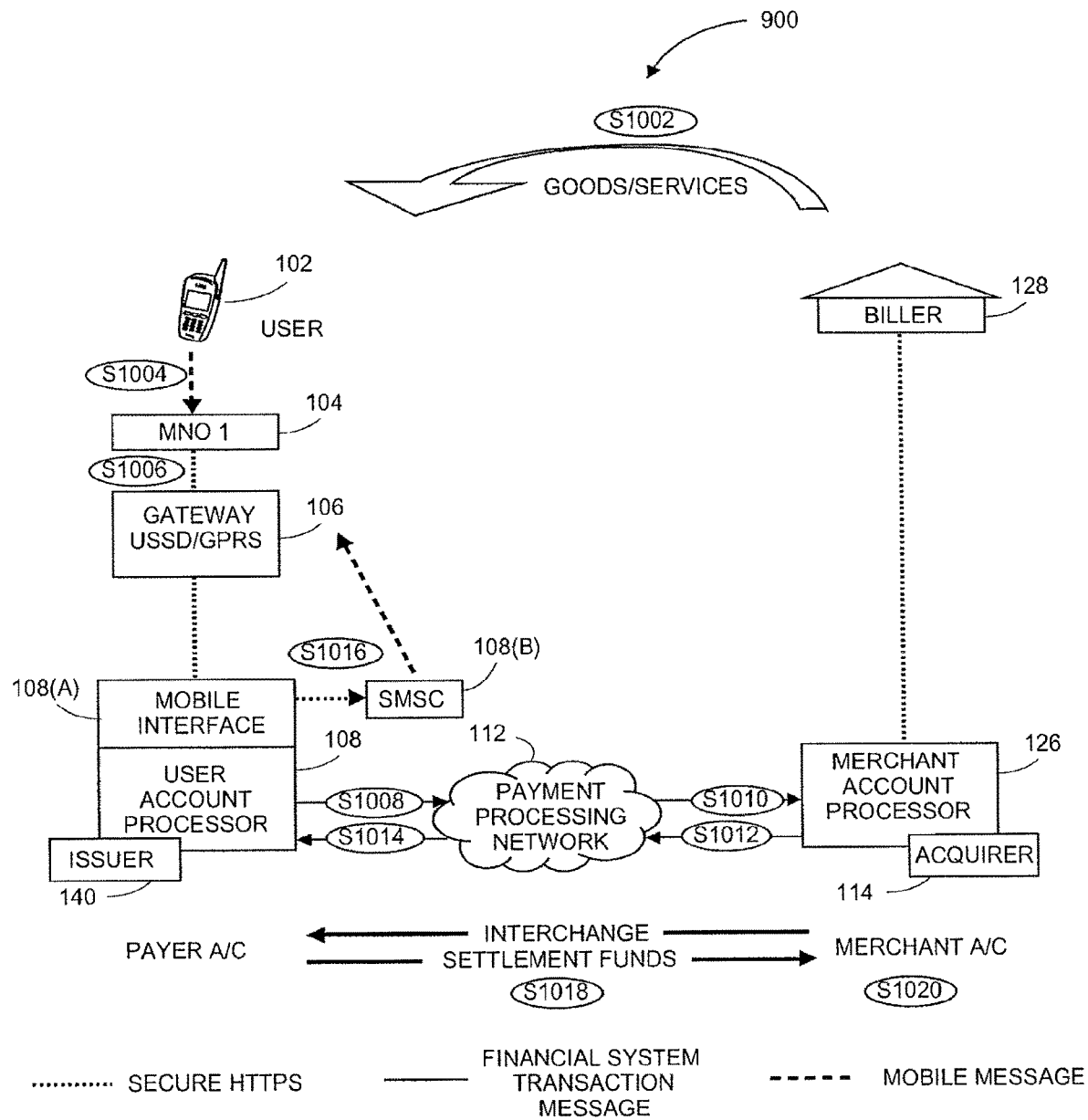
FIGS. 9 and 10 illustrate the operation of a user transferring money to a recipient user using the system.
Figure 10:
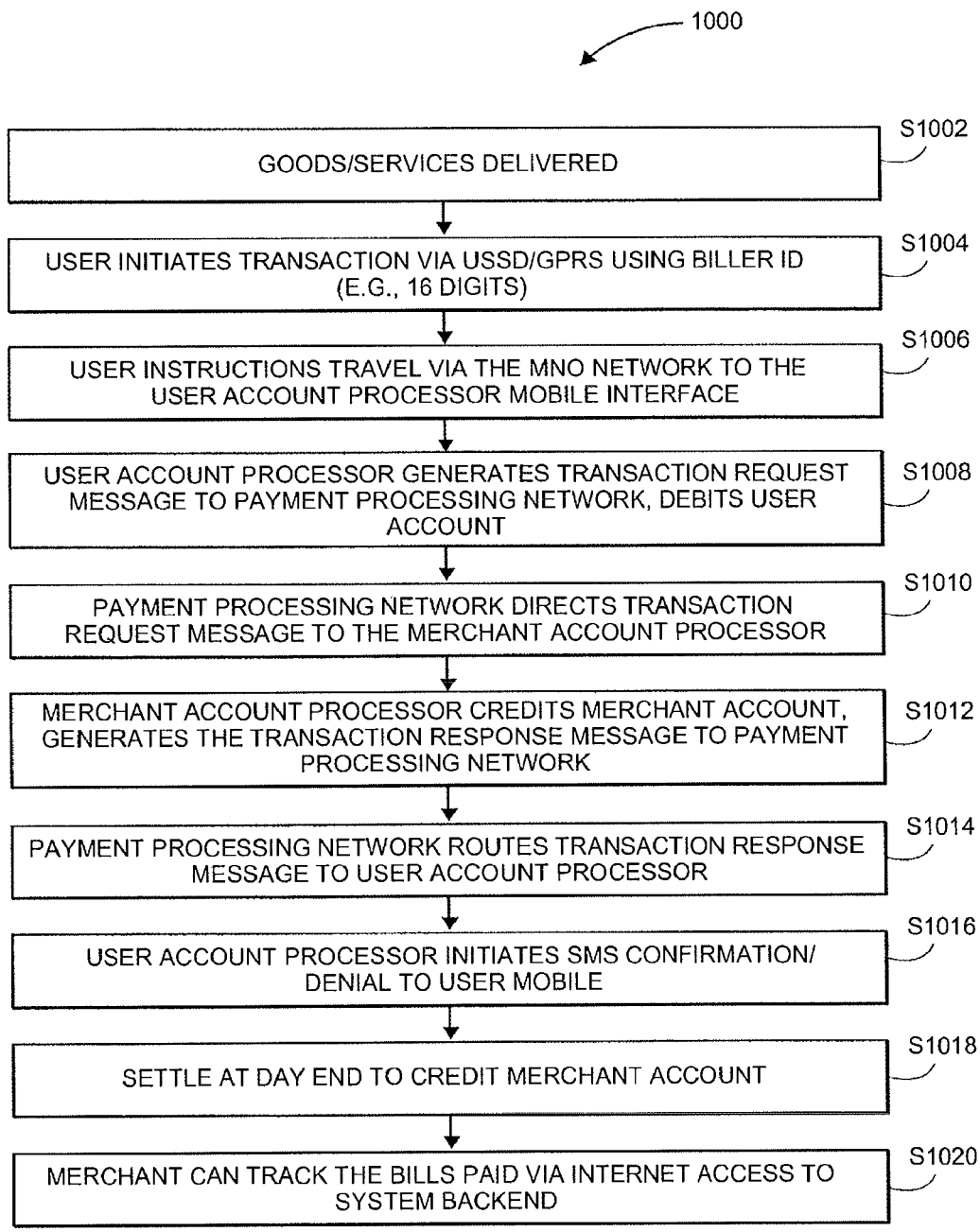

In another exemplary embodiment, the user may wish to pay a merchant remotely, instead of traveling to the merchant's location. In this embodiment, the merchant may or may not have a mobile device identifier, and the method may or may not include the use of the merchant's mobile device identifier. FIG. 9 illustrates a system overview in conjunction with FIG. 10 illustrating an exemplary message flow between the various entities of system 900 according to another embodiment of the present invention. The embodiment illustrated in FIGS. 9 and 10 illustrates the operation of a user transferring money to a merchant using the mobile banking system 100 illustrated in FIG. 1 (corresponding to system 900 of FIG. 9).

A user may desire to remotely conduct a payment transaction to a merchant 128, using a user mobile communications device 102, in step S1002 of FIG. 10, after goods or services have been delivered by the merchant (alternatively referred to as a biller), or after a bill has been issued to the user. In some embodiments, a remote payment may first be completed before goods or services are delivered to the user (e.g., for prepaid electricity, prepaid airtime, prepaid digital TV services).

In step S1004, the user initiates a transaction via MNO1 104 by sending a communication (e.g., SMS) including (1) a bill amount, and (2) the merchant's ID.

In step S1006, the user instructions travel via the MNO1 104 network and USSD/GPRS Gateway 106 to the user account processor server computer 108, and may be processed by a mobile interface 108(*a*) operating on the user account processor server computer 108. The communication is received by the user account processor server computer 108 as a secure https message (e.g., via the Internet).

In step S1008, the user account processor server computer 108 then generates and transmits a transaction request message to a payment processing network 112, and debits the user account. The transaction request message comprises a transaction type indicator indicating that the transaction is a remote payment transaction for the purchases of goods and services from a merchant, an amount associated with the transfer of funds (e.g., $25), and the merchant ID. The transaction request message may be properly formatted and transmitted as a secure financial system transaction message. The transaction request message may comprise a PAN (primary account number) comprising at least one (and preferably all) of an identifier for the recipient of the authorization request message (which may be a six digit number that is similar to a BIN or bank identification number), Bill number and/or customer number with the biller, the transaction type indicator, and the mobile communications device identifier of the second identity (or a second entity identifier), as well as an optional check digit. In embodiments of the invention, the transaction may be forwarded as SMS OC (single message service open connectivity) or Base 1 OC (Base 1 open connectivity). It may also be formatted as an ISO 8583 type financial transaction message.

Once the transaction request message is received at the payment processing network 112, a central server computer in the payment processing network 112 may then route the transaction request message to the appropriate downstream server computer. Thus, the method may further comprise receiving, from the user account processor server computer 108 at a central server computer (not shown) in the payment processing network 112, the transaction request to transfer funds from the first entity (e.g., the user) to a second entity (e.g., the merchant). The transaction request message comprises a transaction type indicator, an amount associated with the transfer of funds, and an identifier used by the second entity. The central server computer then parses the transaction request message, determines a second server computer (e.g., the merchant account processor computer 108) associated with the second entity (e.g., the merchant), and transmits the transaction request message to the second server computer.

In step S1010, the payment processing network 112 forwards the transaction request message to a merchant account processor server computer 126. The transaction request message may be transmitted via a secure financial system transaction message.

In step S1012, the merchant account is credited, and a transaction response message, which confirms or denies the transaction, is initiated to the payment processing network 112. The transaction response message may comprise various pieces of information such as at least one of the approved transaction amount, an indication that the transaction was approved or not approved, an indication that the transaction was partially approved, prepaid token numbers (in case services availed are of prepaid type) and identifiers for the entities (or their mobile devices) involved in the transaction.

The central server computer in the payment processing network may then receive the transaction response message from the second server computer (e.g., the merchant account processor server computer), parse the transaction response message, and determine the first server computer (e.g., the user account processor server computer). The central server computer then transmits the transaction response message to the first server computer. For example, in step S1014, the payment processing network 112 forwards the transaction response message confirming/denying the transaction back to the user account processor server computer 108.

Then in step S1016, the user account processor server computer 108 initiates a SMS message, through the user SMSC 108(*b*), forwarding the confirmation/denial of the transaction to the user mobile communication device 102.

To complete the transaction, in step S1018, an interchange, and clearing and settlement can be performed by the payment processing network 112. This can be done at the end of the day or at any other suitable time period in order to transfer the appropriate funds from the user's account to the merchant's account.

Face to Face (F2F) Merchant Transaction

Figure 11:
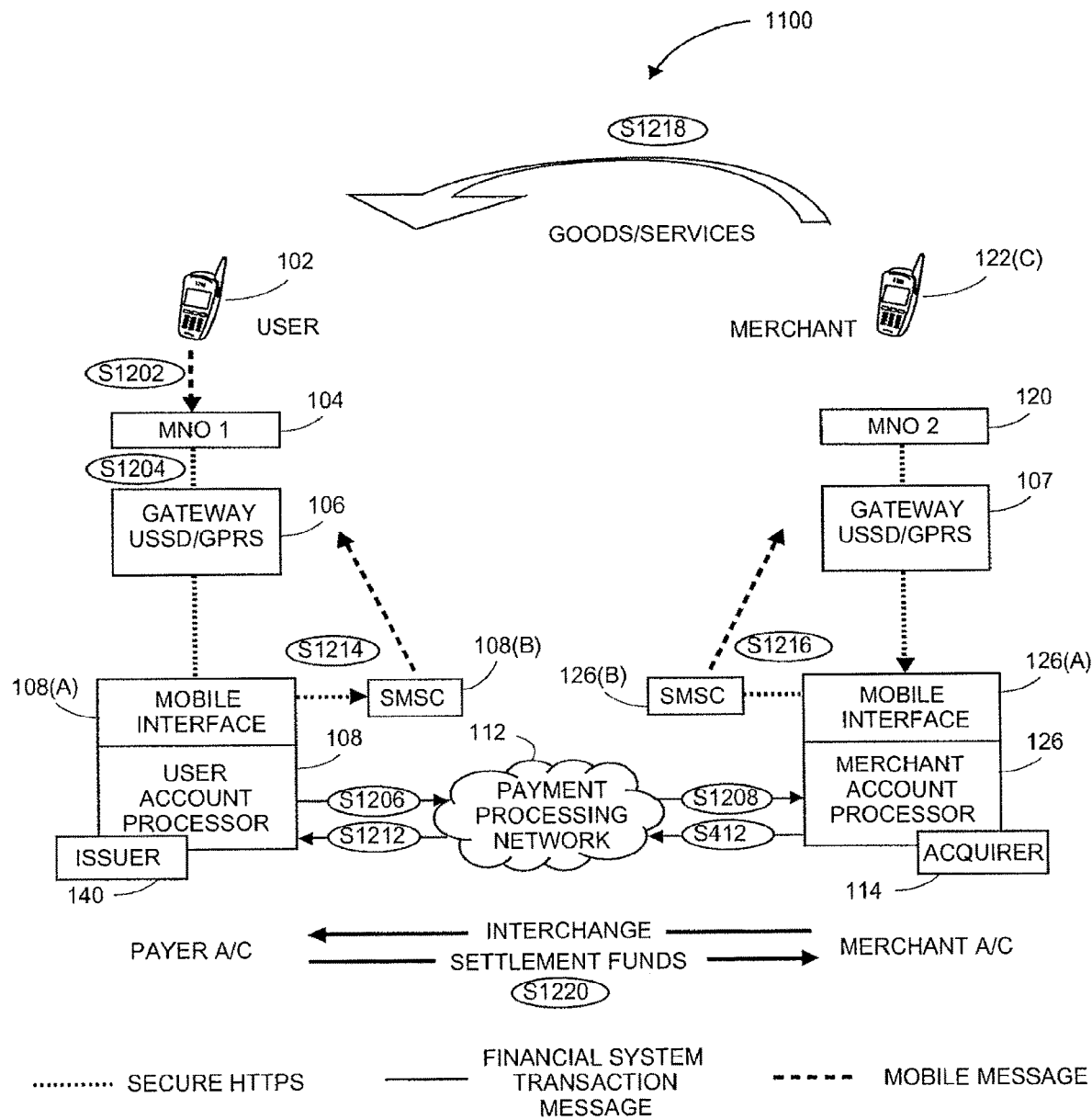
FIGS. 11 and 12 illustrate the operation of a user transferring money to a recipient user using the system.
Figure 12:
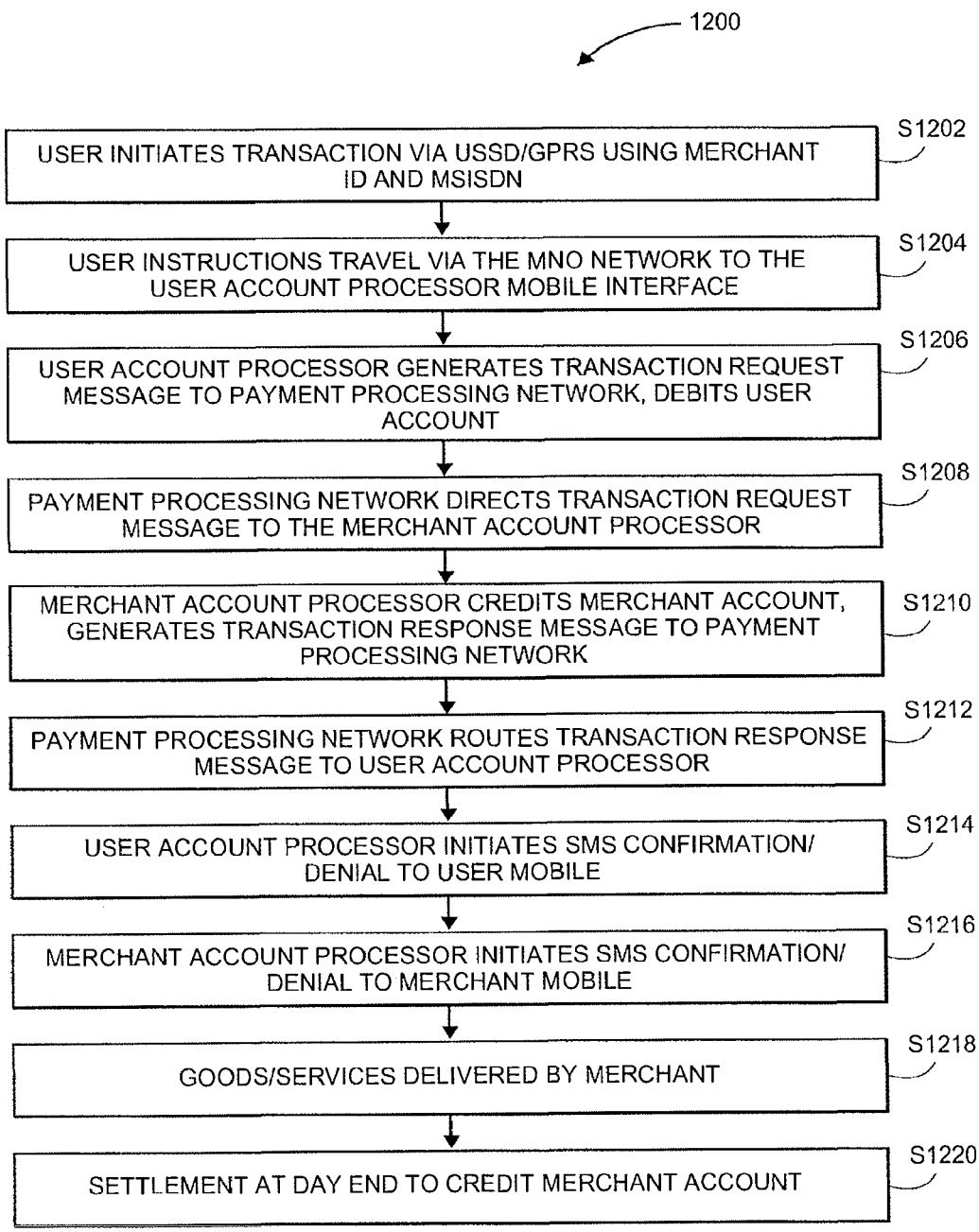

In another exemplary embodiment, the user may wish to pay for a transaction face-to-face at a merchant using a user mobile communications device, instead of using cash. FIG. 11 illustrates a system overview in conjunction with FIG. 12 illustrating an exemplary message flow between the various entities of system 1100 according to another embodiment of the present invention. The embodiment illustrated in FIGS. 11 and 12 illustrates the operation of a user transferring money to a recipient user using the mobile banking system 100 illustrated in FIG. 1 (corresponding to system 1100 of FIG. 11).

When a user desires to use his mobile communications device 102 to pay for a transaction face-to-face at a merchant with a merchant mobile communications device 122(c), in step S1202 of FIG. 12, the user initiates a transaction via MNO1 104 by sending a communication (e.g., SMS), using the user mobile communications device 102, including (1) an amount for the payment, (2) the merchant's ID, and (3) the merchant's mobile communications device identifier (e.g., MSISDN). In step S1204, the user instructions travel via the MNO1 104 network and USSD/GPRS Gateway 106 to the user Account Processor server computer 108, and may be processed by a mobile interface 108(a) operating on the user account processor server computer 108. The communication is received by the user account processor server computer 108 as a secure https message (e.g., via the Internet).

In step S1206, the user account processor server computer 108 then generates and transmits a transaction request message to a payment processing network 112, and debits the user's account. The transaction request message comprises a transaction type indicator indicating that the transaction is a face-to-face payment transaction for the purchases of goods and services from a merchant, an amount associated with the transfer of funds (e.g., $250), and the merchant mobile device identifier. The transaction request message may be properly formatted and transmitted as a secure financial system transaction message. The transaction request message may comprise a PAN (primary account number) comprising at least one (and preferably all) of an identifier for the recipient of the authorization request message (which may be a six digit number that is similar to a BIN or bank identification number), the transaction type indicator, and the mobile communications device identifier of the second identity (or a second entity identifier), as well as an optional check digit. In embodiments of the invention, the transaction may be forwarded as SMS OC (single message service open connectivity) or Base 1 OC (Base 1 open connectivity). It may also be formatted as an ISO 8583 type financial transaction message.

Once the transaction request message is received at the payment processing network 112, a central server computer in the payment processing network 112 may then route the transaction request message to the appropriate downstream server computer. Thus, the method may further comprise receiving, from the user account processor server computer 108 at a central server computer (not shown) in the payment processing network 112, the transaction request to transfer funds from the first entity (e.g., the user) to a second entity (e.g., the merchant). The transaction request message comprises a transaction type indicator, an amount associated with the transfer of funds, and an identifier used by the second entity. The central server computer then parses the transaction request message, determines a second server computer (e.g., the merchant account processor computer 126) associated with the second entity (e.g., the merchant), and transmits the transaction request message to the second server computer.

In step S1208, the payment processing network 112 forwards the transaction request message to the merchant account processor server computer 126. The transaction request message may be transmitted via a secure financial system transaction message.

In step S1210, the merchant account is credited, and a transaction response message, which confirms or denies the transaction, is generated by the merchant account processor server computer 126 and is transmitted to the payment processing network 112. The transaction response message may comprise various pieces of information such as at least one of the approved transaction amount, an indication that the transaction was approved or not approved, an indication that the transaction was partially approved, and identifiers for the entities (or their mobile devices) involved in the transaction.

The central server computer in the payment processing network may then receive the transaction response message from the second server computer (e.g., the merchant account processor server computer), parse the transaction response message, and determine the first server computer (e.g., the user account processor server computer). The central server computer then transmits the transaction response message to the first server computer. For example, in step S1212, the payment processing network 112 forwards the transaction response message confirming/denying the transaction back to the user account processor server computer 108.

Then in step S1214, the merchant account processor server computer 126 initiates a SMS message, through a merchant SMS center 126(b), forwarding the confirmation/denial of the transaction to the merchant mobile communication device 128. Also, in step S1216, the user account processor server computer 108 initiates a SMS message, through a user SMS center 108(b), forwarding the confirmation/denial of the transaction to the user mobile communications device 102.

In step S1218, goods or services may be delivered by the merchant. To complete the transaction, in step S818S1220, an interchange, and clearing and settlement can be performed by the payment processing network 112. This can be done at the end of the day or at any other suitable time period in order to transfer the appropriate funds from the user's account to the merchant's account.

Withdrawal at ATM Transaction

Figure 13:
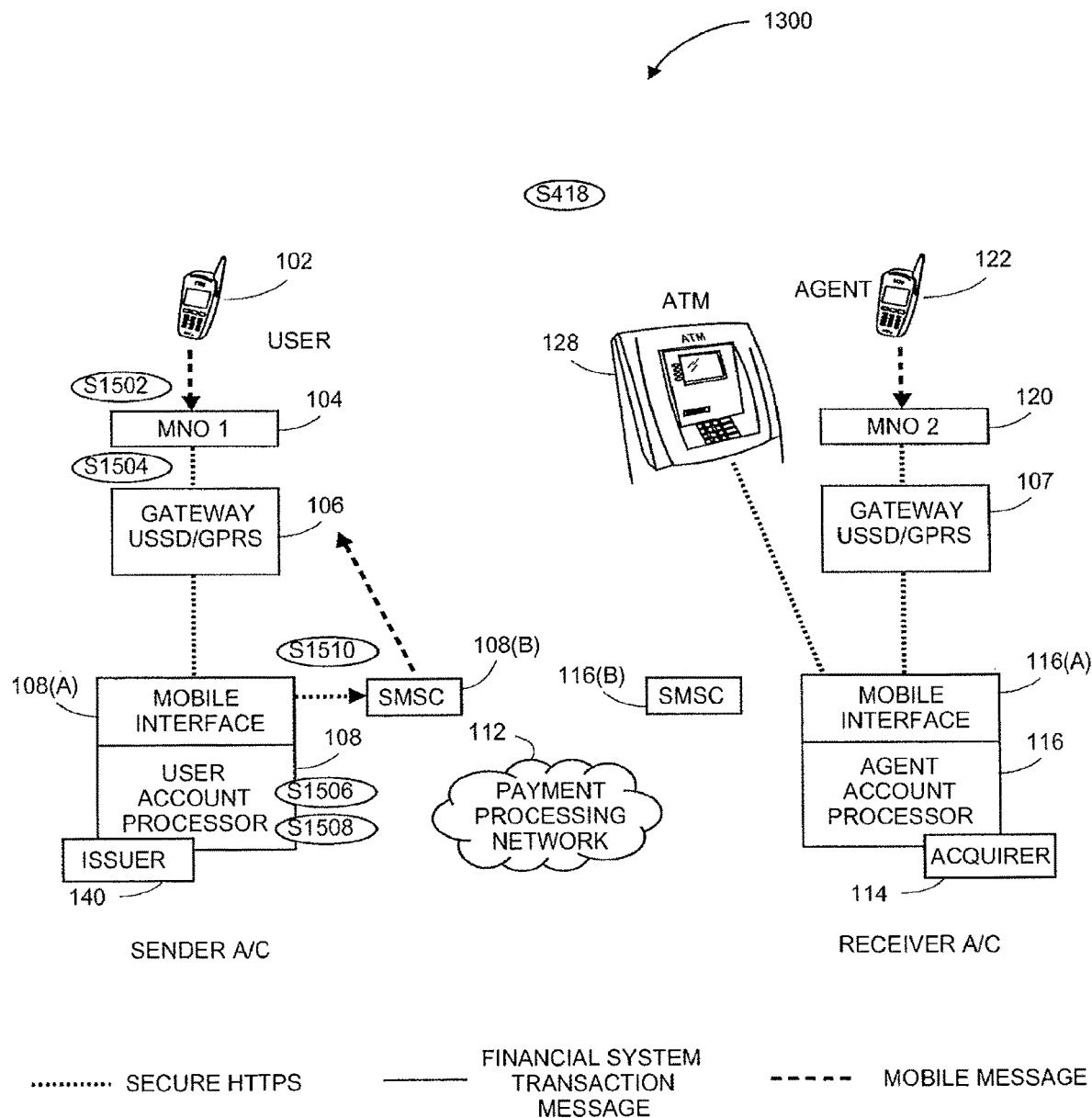
FIGS. 13 to 16 illustrate the operation of a user withdrawing cash from an ATM.
Figure 14:
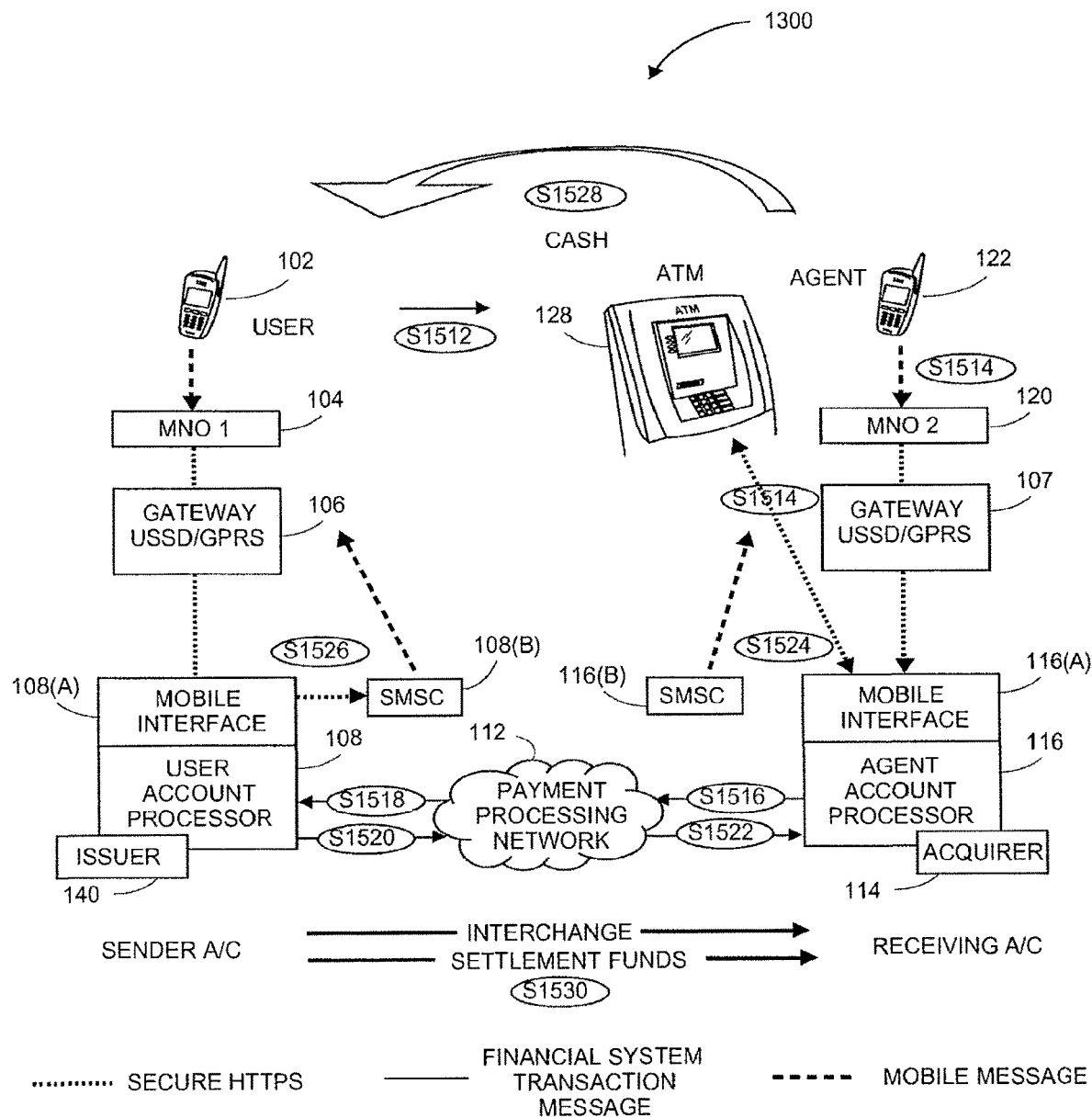
Figure 15:
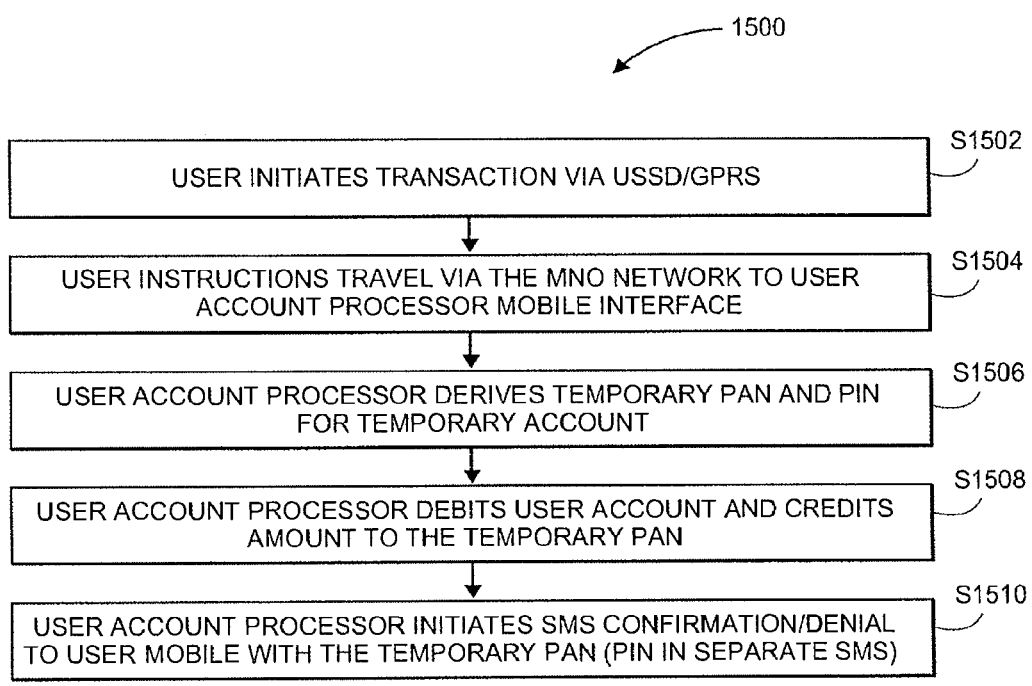
Figure 16:
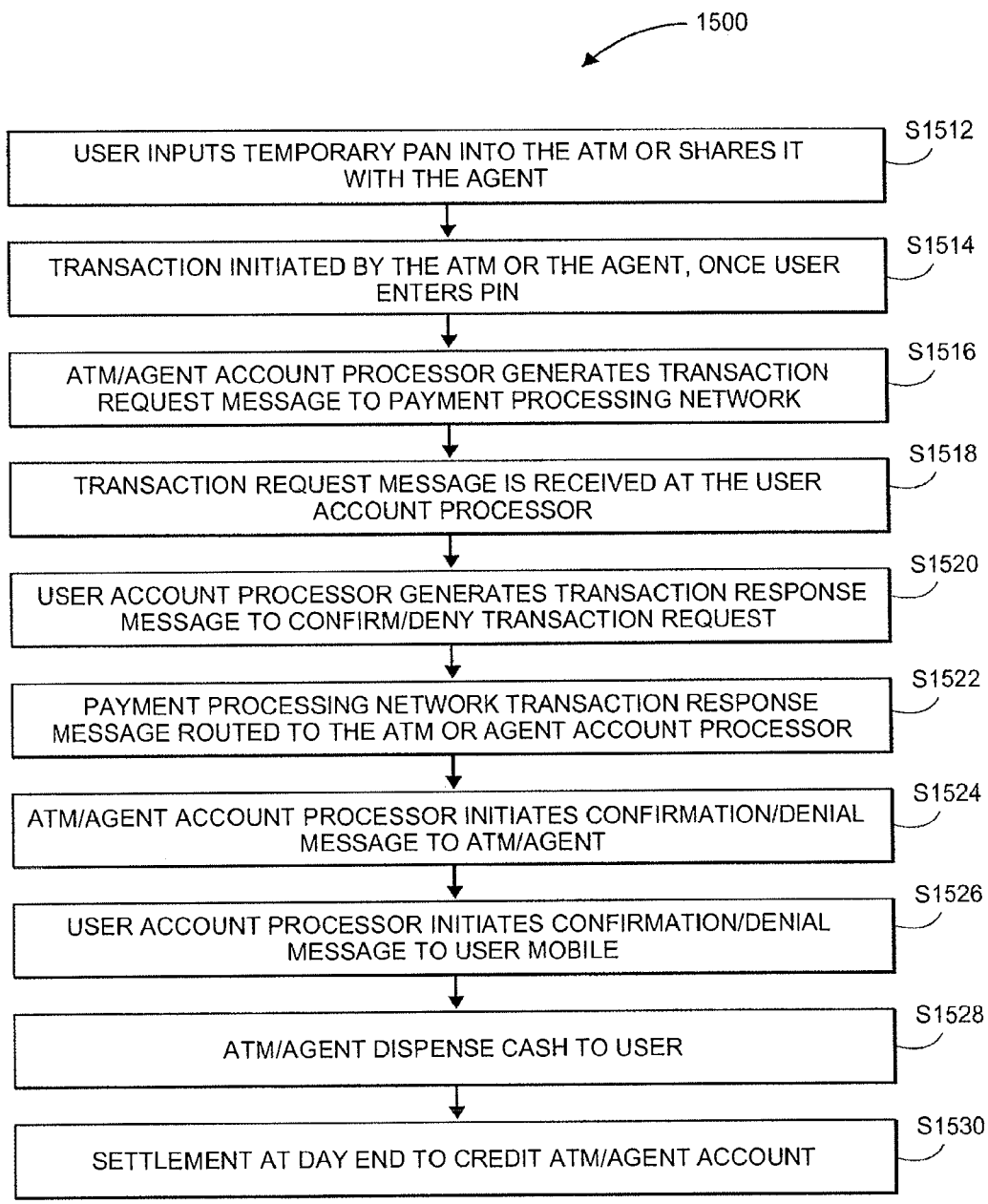

In another exemplary embodiment, a user may wish to withdraw money using a user mobile communications device from an agent, however, the agent (e.g., local business) may be closed, unavailable, or lack sufficient cash. Thus, the user may need to withdraw money from an ATM using the user mobile communications device. Or, alternatively, an unregistered used may wish to withdraw cash from an agent. FIGS. 13 and 14 illustrate a system overview in conjunction with FIGS. 15 and 16 illustrating an exemplary message flow between the various entities of system 1300 according to another embodiment of the present invention. The embodiment illustrated in FIGS. 15 and 16 illustrates the operation of a user withdrawing cash from an ATM or agent using the mobile banking system 100 illustrated in FIG. 1 (corresponding to system 1300 of FIGS. 13 and 14).

To withdraw cash using a user mobile communications device 102, in step S1502, the user may initiate a transaction using a user mobile communications device 102 via a USSD/GPRS Gateway 106. In step S1504, the user instructions travel via the MNO1 104 network to a user mobile interface 108(a), which may be operated on a user account processor server computer 108.

In step S1506, the user account processor server computer 116 may derive a one-time, temporary PAN. In embodiments of the invention, the one-time temporary PAN may be 16-digits long. A temporary PIN associated with the one-time temporary PAN is also generated by the user account processor server computer 108. The temporary PAN or PIN can be dynamic in nature, and may be vary for each transaction that is conducted. For instance, in some cases, temporary PANs and PINs may vary based upon counter values (or other dynamic variables such as time of day). Those of ordinary skill in the art can select from different algorithms to create dynamic PANs and PINs.

The user account is debited in step S1508 by the user Account Processor server computer 108, and it subsequently credits the amount to the derived one-time temporary PAN.

In step S1510, the user account processor server computer 108 initiates a SMS message confirmation/denying successfully generation of the one-time temporary PAN, and transmits the one-time PAN in the SMS message to the user. The associated PIN may be transmitted to the user in a separate SMS message.

Referring to FIG. 14, in step S1512, the consumer may approach an ATM 128 (or an agent with an agent mobile communications device 122), and input the one-time temporary PAN. When the transaction is initiated by the ATM 128 or agent mobile communications device 122, the user may enter the associated one-time PIN in step S1514.

In step S1516, the ATM 128 or agent account processor server computer 116 generates and transmits a transaction request message (e.g., an SMS or single message service authorization message) to the payment processing network 112. The transaction request message may include the inputted one-time-PAN, along with the PIN, and other information (e.g., the amount of the transaction).

Once the transaction request message is received at the payment processing network 112, a central server computer in the payment processing network 112 may then route the transaction request message to the appropriate downstream server computer. Thus, the method may further comprise receiving, from the agent account processing server computer 116 at a central server computer (not shown) in the payment processing network 112, the transaction request to transfer funds from the first entity (e.g., the entity associated with the ATM or agent) to a second entity (e.g., the user). The transaction request message comprises a transaction type indicator (e.g., an ATM withdrawal transaction), an amount associated with the transfer of funds, and an identifier used by the second entity (e.g., the second entity's phone number). The central server computer then parses the transaction request message, determines a second server computer (e.g., the user account processor computer 108) associated with the second entity (e.g., the user), and transmits the transaction request message to the second server computer.

In step S1518, the transaction request message is received at the user account processor server computer 108.

Then, in step S1520, the user account processor server computer generates and transmits a transaction response message, confirming/denying the transaction. The transaction response message may comprise various pieces of information such as at least one of the approved transaction amount, an indication that the transaction was approved or not approved, an indication that the transaction was partially approved, and identifiers for the entities (or their mobile devices) involved in the transaction.

The central server computer in the payment processing network may then receive the transaction response message from the second server computer (e.g., the user account processor server computer), parse the transaction response message, and determine the first server computer (e.g., the agent account processor server computer). The central server computer then transmits the transaction response message to the first server computer. For example in step S1522, the payment processing network 112 routes the transaction response message to the ATM 128 or agent account processor server computer 116 to confirm/deny the transaction.

The ATM 128 or agent account processor server computer 116 may then initiate a confirmation/denial message to be displayed on the ATM 128 to the user, or respectively, to the agent mobile communications device 122, through an agent SMS center 116(b), in step S1524. Also, in step S1526, the user account processor server computer 108 initiates a SMS confirmation/denial message, through a user SMS center 108(b), to the user mobile communications device 102.

Then in step S1528, the ATM 128 or agent 122 dispenses cash to the user.

To complete the transaction, in step S1530, an interchange, and clearing and settlement can be performed by the payment processing network 112. This can be done at the end of the day or at any other suitable time period in order to transfer the appropriate funds from the user's account to the merchant's account.

In another embodiment, a consumer may use a one-time use temporary PAN to conduct a transaction at an e-commerce website, or at an enabled POS terminal. The consumer may request a one-time use temporary PAN as described in FIGS. 13 and 15, and receive, at a consumer mobile communications device, a one-time use temporary PAN, expiry, and a CVV2 (card verification value). At the e-commerce website, or at a merchant outlet with an enabled POS machine, after selecting items the consumer wishes to purchase, the consumer may be prompted to input the one-time PAN, expiry, and CVV2 into a check out page on the e-commerce website (or on the POS machine) to complete the transaction. The e-commerce website or POS machine may be operated on an e-commerce or merchant server computer, which transmits the instructions, via secure https (e.g., Internet) to an e-commerce or POS acquirer processor server computer. The e-commerce or POS acquirer processor, which may perform similar functions to that of an agent account processor server computer (e.g., 116 of FIG. 13), then generates a transaction request message to a consumer account processor (e.g., 108 of FIG. 13) via a payment processing network (e.g., 112 of FIG. 13). The consumer account processor (e.g., 108 of FIG. 13) then authorizes the transaction, generates and transmits transaction response message to the e-commerce acquirer processor via the payment processing network (e.g., 112 of FIG. 13). The consumer account processor (e.g., 108 of FIG. 13) may also initiate a confirmation/denial message to the consumer mobile communications device (e.g., 102 of FIG. 13) via SMS or other mobile message. Upon receipt of the transaction response message, the e-commerce acquirer may credit the merchant account, and may transmit a confirmation/denial to the e-commerce website via secure https or the Internet, indicating that the transaction is complete. A settlement may occur at the end of the day to credit the e-commerce or POS acquirer account and debit the consumer account.

PAN Generation

Figures 1, 17A:
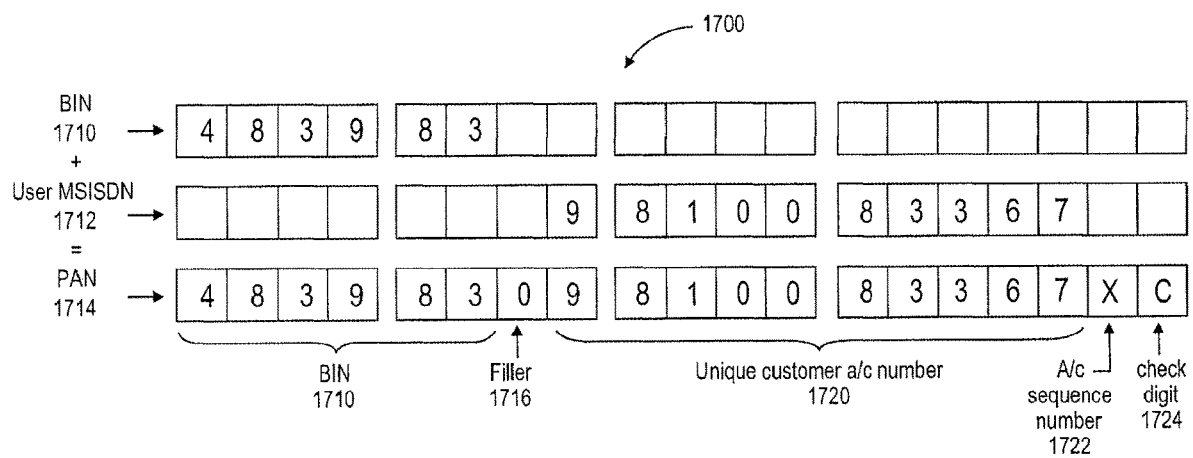
Figures 2, 17A:
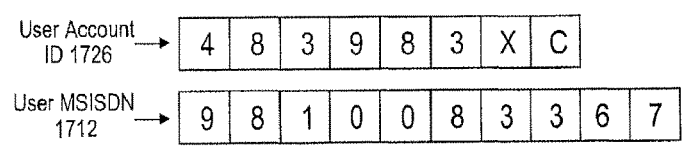

Each of the above described embodiments describing a deposit transaction (FIGS. 3 and 4), a withdrawal transaction (FIGS. 5 and 6), a money transfer transaction (FIGS. 7 and 8), a remote payment transaction (FIGS. 9 and 10), and a F2F merchant transaction (FIGS. 11 and 12), can include the use of a PAN that includes a number that can be used to route a transaction request message (e.g., a number that identifies the recipient of the message, which may be similar to a six digit BIN), as well as second entity ID or second mobile device identifier. FIG. 17A-1 shows an exemplary PAN 1700 used upon opening an account according to an embodiment of the invention. The PAN is generated by the second entity at account opening and remains linked to that account. Thereafter the PAN may be generated by a first entity generating a transaction request message to a second entity for multiple transactions. To identify the recipient of the transaction request message, the PAN may include a user ID, such as a six-digit BIN 1710, which may identify the user. In this example, the user may be a "second entity" as in the "cash in" example described with reference to FIG. 3, above. This number may identify an account of the user that is maintained by the user account processor server computer 108. The user ID may comprise a series of numbers, letters, and/or combination of both, and may be provided by an issuer or acquirer (see 140 and 114, respectively, in FIGS. 1, 3, 5, 9, 11, 13, and 14). For example, user ID 1710 comprises 6 numerical digits corresponding to a BIN.

Another input to the PAN may be a user mobile communications device identifier, such as a MSISDN 1712. An exemplary MSISDN may be 10 digits long. The PAN 1714 may include concatenating the user ID 1710 (e.g., BIN), a filler digit 1716 (e.g., may be zero), and be combined with a unique customer account number 1720 (e.g., all or part of the user MSISDN 1712), an account sequence character 1722, and a check digit character 1724. The account sequence character allows a user to have multiple accounts and transactions using the same MSISDN. The check digit character 1724 is used for error detection so ensure that the information that passes between two entities has not been changed.

In this example 1700 of FIG. 17A-1, a 19-digit PAN 1714 is created in opening an associated account. The six-digit BIN or user ID 1710 may occupy the first six positions of the 19-digit PAN. Position 7 may be occupied by a filler digit 1716, and in some embodiments may be zero. Positions 8-17 of the 19-digit PAN 1714 may be occupied by a unique customer account number 1720, which may also be the user mobile communications device identifier (e.g., MISDN 1712). If the MSISDN is less than 10 digits, the MSISDN may be right-justified and zeros may be placed on the left to occupy 10 digits. Position 18 may be occupied by an account sequence number 1722, and may valid values may range from 1-9. A check digit 1724 may occupy position 19, and the check digit 1724 may be calculated using a Luhn (mod 10) algorithm.

In the example 1700 of FIG. 17A-1 showing a 19-digit PAN, an originating user account processor server computer may calculate a destination PAN by concatenating the recipient MSISDN and the recipient account ID, as shown in FIG. 17A-2. FIG. 17A-2 shows data inputted by originating user. For example, a user account ID 1726 may be identified by concatenating the BIN 1710, account sequence number 1722, and check digit 1724. Likewise, a recipient account processor server can determine the recipient user MSISDN 1712 and account sequence from the PAN 1714. Account processors can determine for each transaction whether the data inputted is not erroneous, by checking the check digit inputted against the one calculated using the Luhn algorithm.

Figure 17B:
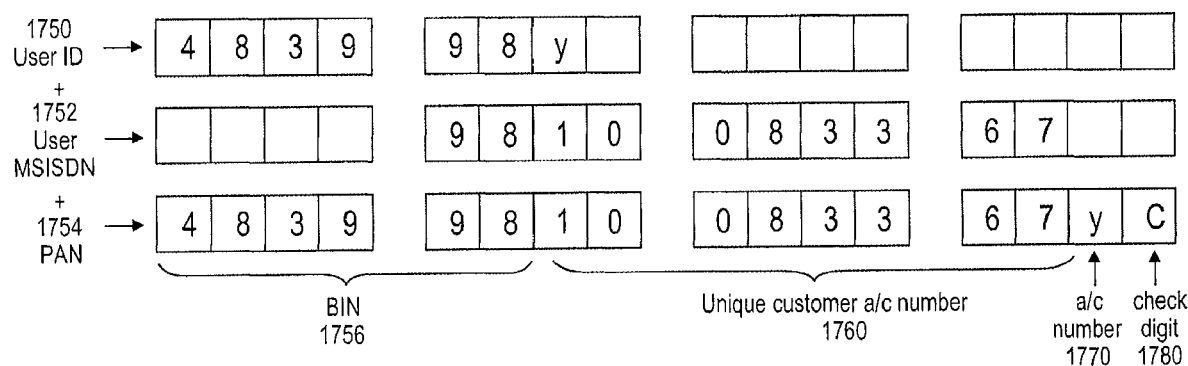
FIG. 17B illustrates an exemplary account number derived according to an embodiment of the invention.

In other embodiments, a 16-digit PAN may be derived. FIG. 17B shows an exemplary 16-digit PAN. The 16-digit PAN 1754 may be derived based on a user ID 1750 (e.g., identifier for recipient), a user mobile communications device identifier 1752 (e.g., MSISDN), an account sequence number 1770, and a check digit 1780. In this example, the user ID 1750 may comprise a six-digit BIN 1756 and account sequence number 1770. The unique customer account number 1760 may comprise all or some of the user MSISDN 1752. In this example, the unique customer account number 1760 comprises the last 8 digits of the user MSISDN 1752. It is noted in this example, the user ID 1750 and the user MSISDN 1752 overlap ("98"). In other embodiments, numbers in these two pieces of data need not overlap. The account sequence number 1770 allows a user to have multiple accounts and transactions using the same MSISDN. The check digit character 1780 is used for error detection so ensure that the information that passes between two entities has not been changed.

One-Time Use PAN Generation

In the embodiment of the invention described by FIGS. 13-16, a one-time use, temporary PAN may be generated by the user account processor server computer (108 in FIGS. 1, 13, and 14). The one-time use PAN may be comprised by 16-digits, and may be in a virtual (e.g., cardless) form. In some embodiments, the one-time use PAN may be associated with the same BIN used in a 19-digit PAN described above. Thus, for example, a user may be a derived 19-digit PAN for general use and a one-time use PAN for a specific transaction to be conducted once. The one-time use PAN may be randomly generated or any other suitable algorithm.

The one-time use PAN may only be used once for the amount indicated at creation (e.g., step S1506 of FIG. 15) when the amount is debited from the user account (e.g., step 1508 of FIG. 15). In some embodiments, the user may have a limited time in which the one-time use PAN may be used for a transaction. For example, the one-time use PAN may be valid for only 24 hours from the time the one-time use PAN is created. If the one-time PAN remains unused after the valid time has expired, the amount in the one-time PAN may be credited back to the user's account.

The one-time use PAN may be used at an ATM, at an agent, or in other embodiments, at an e-commerce website, or at any other enabled acceptance device like a POS machine. During an ATM transaction or unregistered withdrawal from an agent, a one-time use PIN may also be generated. For use at an e-commerce website or at an enabled acceptance device, the user may be requested to enter the one-time use PAN, and also a CVV2 value and expiry date.

Computer System Components

Figure 18:
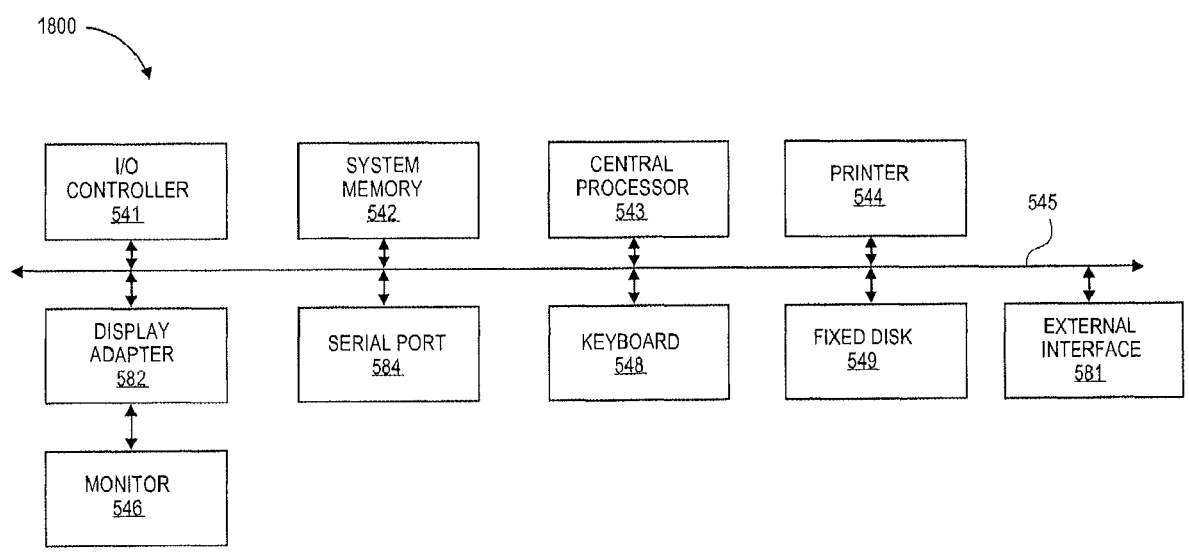
FIG. 18 is a block diagram of an exemplary computer apparatus.

FIG. 18 is a high level block diagram of a computer apparatus. Any of the individual components in the Figures in this application may include one or more of the subsystems or components shown in FIG. 18. The subsystems shown in FIG. 18 are interconnected via a system bus 545. Additional subsystems such as printer 544, keyboard 548, fixed disk 549, monitor 546, which is coupled to display adapter 582, and others are shown. Peripherals and input/output (I/O) devices, which couple to I/O controller 541, can be connected to the computer system by any number of means known in the art, such as serial port 584. For example, serial port 584 or external interface 581 can be used to connect the computer apparatus to a wide area network such as the Internet, a mouse input device, or a scanner. The interconnection via system bus 545 allows central processor 543 to communicate with each subsystem and to control the execution of instructions from system memory 542 or fixed disk 549, as well as the exchange of information between subsystems. The system memory 542 and/or fixed disk 549 may embody a computer readable medium.

Menus

Figure 19:
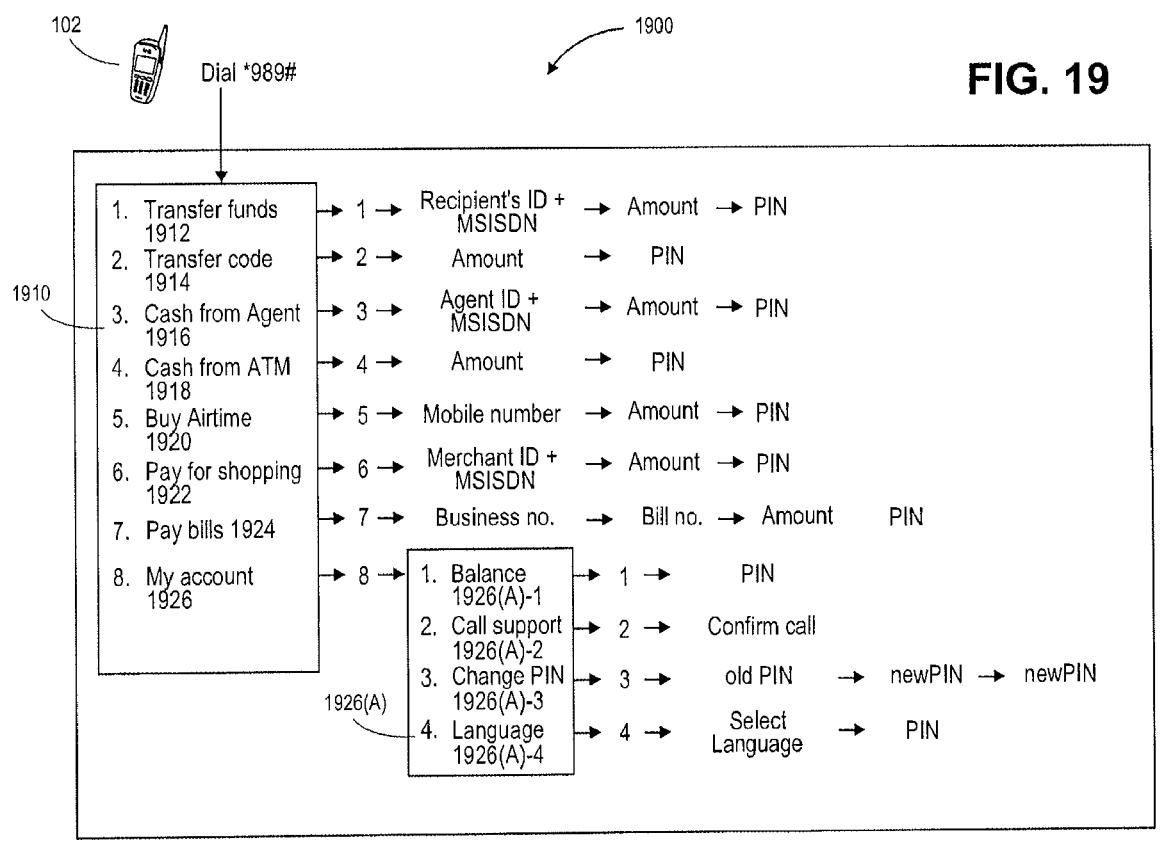
FIG. 19 shows an exemplary user interface menu display and flow on a user's mobile communications device according to an embodiment of the invention.

In embodiments of the invention, a user or agent may use an interface on their respective mobile communication device to conduct banking transactions described above. FIG. 19 shows an exemplary interface for a user's mobile communications device mobile menu. For example, the user may operate a user mobile communications device 102 and dial *989# to access a main menu 1910. The main menu 1910 may present options to conduct different types of transactions or perform other tasks. Main menu 1910 options may include, transferring funds, transferring a code (e.g., one-time-PAN), withdrawing cash from an agent, withdrawing cash from an ATM, buy more airtime, pay for shopping at a merchant, pay bills, or change account settings.

If the user selects to "Transfer funds" 1912 by pressing or selecting "1," the user may be prompted to enter a recipient's ID and a recipient MSISDN. Then the user may be prompted to enter an amount to be transferred and a PIN to confirm the transfer.

If the user selects "Transfer code" 1914 by pressing or selecting "2," the user may be prompted to enter an amount, and then a PIN to confirm the transaction If the user selects "Cash from Agent" 1916 by pressing or selecting "3," the user may be prompted to enter an agent's ID and an agent mobile communications device identifier (e.g., MSISDN). Then the user may be prompted to enter an amount to withdraw and a PIN to confirm the transaction.

If the user select "Cash from ATM" 1918 by pressing or selecting "4," the user may be prompted to enter an amount to withdraw, and a PIN for confirmation. Then the user may wait to receive an SMS with a derived one-time PAN and associated derived PIN.

If the user selects "Buy Airtime" 1920 by pressing or selecting "5," the user may be prompted to enter his user mobile communications device identifier, the amount of airtime to purchase (e.g., minutes), and a PIN to confirm the airtime purchase.

If the user selects "Pay for shopping" 1922 by pressing or selecting "6," the user may be prompted to enter a merchant ID and a merchant MSISDN. Then the user may be prompted to enter an amount for payment and PIN to confirm the transaction.

If the user selects "Pay bill" 1924 by pressing or selecting "7," the user may be prompted to enter a business identifier, a bill identifier, a bill amount, and a PIN to confirm the bill payment.

If the user select "My account" 1926 by pressing or select "8," a submenu 1926(a) may provide more options, including access to view an account "Balance" 1926(a)-1, request to "Call support" 1926(a)-2, request to "Change PIN" 1926(a)-3, and/or request to select a "Language" 1926(a)-4. To view an account balance 1926(a)-1, the user may be prompted to enter a PIN to access the balance. To call support 1926(a)-2, selecting "2" may immediately connect the user to support. To change PIN 1926(a)-3 by selecting "3," the user may be prompted to enter the old PIN, then enter a new PIN twice for confirmation. To change the language 1926(a)-4 by selecting "4," the user may be prompted to select a language, and then a PIN to confirm the selection.

Figure 20:
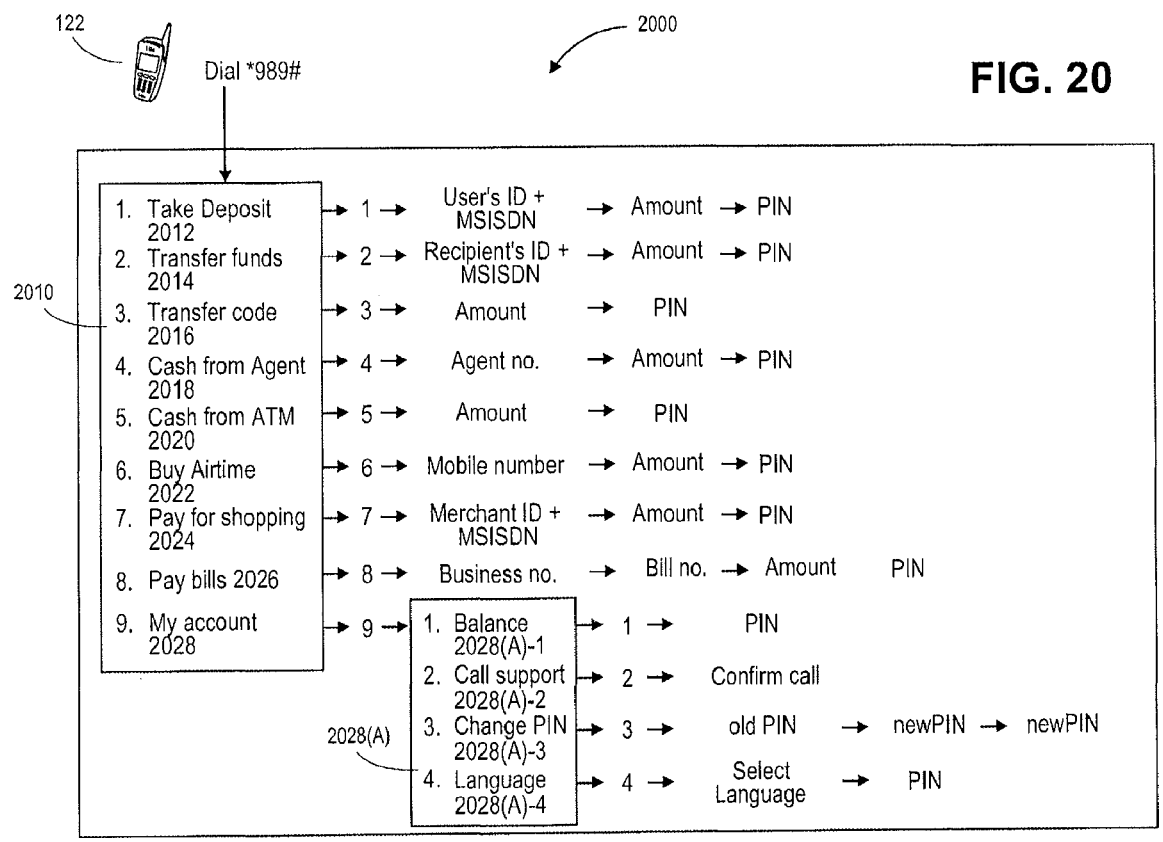
FIG. 20 shows an exemplary agent interface menu display and flow on an agent's mobile communications device according to an embodiment of the invention

In embodiments of the invention, an agent may use an interface on their respective mobile communication device to conduct banking transactions described above with the user and the user mobile communications device. FIG. 20 shows an exemplary interface for an agent's mobile communications device mobile menu, which may be similar to a user's mobile communication device mobile menu. For example, the agent may operate an agent mobile communications device 122 and dial *989# to access a main menu 2010. The main menu 2010 may present options to conduct different types of transactions or perform other tasks. Main menu 2010 options may include, transferring funds, transferring a code (e.g., one-time-PAN), withdrawing cash from an agent, withdrawing cash from an ATM, buy more airtime, pay for shopping at a merchant, pay bills, or change account settings.

If the user selects to "Take deposit" 2012 by pressing or selecting "1," the user may be prompted to enter a depositor's ID and a depositor's MSISDN. Then the agent may be prompted to enter an amount to be deposited and a PIN to confirm the transfer.

If the agent selects "Transfer funds" 2014 by pressing or selecting "2," the agent may be prompted to enter a recipient's ID and recipient's MSISDN, an amount to be transferred, and then a PIN to confirm the transaction If the agent selects "Transfer code" 2016 by pressing or selecting "3," the a may be prompted to enter an amount and a PIN to confirm the transaction.

If the agent selects "Cash from Agent" 2018 by pressing or selecting "4," the agent may be prompted to enter an agent's ID, an amount to withdraw, and a PIN to confirm the transaction.

If the agent selects "Cash from ATM" 2020 by pressing or selecting "5," the agent may be prompted to enter an amount to withdraw, and a PIN for confirmation.

If the agent selects "Buy Airtime" 2022 by pressing or selecting "6," the user may be prompted to enter his agent mobile communications device identifier, the amount of airtime to purchase (e.g., minutes), and a PIN to confirm the airtime purchase.

If the agent selects "Pay for shopping" 2024 by pressing or selecting "7," the agent may be prompted to enter a merchant ID and a merchant MSISDN. Then the agent may be prompted to enter an amount for payment and PIN to confirm the transaction.

If the agent selects "Pay bill" 2026 by pressing or selecting "8," the agent may be prompted to enter a business identifier, a bill identifier, a bill amount, and a PIN to confirm the bill payment.

If the agent select "My account" 2028 by pressing or select "9," a submenu 2028(a) may provide more options, including access to view an account "Balance" 2028(a)-1, request to "Call support" 2028(a)-2, request to "Change PIN" 2028(a)-3, and/or request to select a "Language" 2028(a)-4. To view an account balance 2028(a)-1, the agent may be prompted to enter a PIN to access the balance. To call support 2028(a)-2, selecting "2" may immediately connect the agent to support. To change PIN 2028(a)-3 by selecting "3," the agent may be prompted to enter the old PIN, then enter a new PIN twice for confirmation. To change the language 2028(a)-4 by selecting "4," the agent may be prompted to select a language, and then a PIN to confirm the selection.

Additional Embodiments

In other embodiments, an electronic wallet may be used to conduct a transaction. An electronic wallet may be used in a variety of transactions, including but not limited to eCommerce, social networks, money transfer/personal payments, mobile commerce, proximity payments, gaming, and/or the like. For example, consumers may engage in eCommerce via the electronic wallet for retail purchases, digital goods purchases, and utility payments. Consumers may also, for example, use the electronic wallet to purchase games or gaming credits from gaming websites, and transfer funds to friends via social networks. Further, for example, consumers may also use the electronic wallet on a smart phone for retail purchases, buying digital goods, NFC/RF payments at point of sale (POS) terminals.

In an exemplary transaction involving an electronic wallet, a consumer may submit an indication to purchase or transfer funds. For example, the consumer may visit a merchant website (e.g., Facebook.com, Amazon.com, etc.), and request to purchase an item from the website, transfer funds to a friend, and/or the like. The merchant website may determine whether the electronic wallet is authorized on its website, and may provide a list of payment options. If the merchant is registered with a electronic wallet server, the electronic wallet server may authorize the merchant to collect consumer credentials for login to the electronic wallet, and the merchant website may prompt the consumer to login to the electronic wallet. Otherwise, the merchant website may request the consumer to provide payment details for alternative payment options (e.g., credit card, debit card, PayPal account).

The consumer may authorize submission of their wallet consumer credentials, such as, but not limited to a Wallet/Consumer ID, a password, and/or the like. For example, the consumer may enter the Wallet/Consumer ID and password into a pop-up window provided from the merchant website and/or electronic wallet server. In another example, the consumer may authorize the merchant website to provide the consumer credentials (e.g., previously stored in HTML5, cookies, etc.), to the electronic wallet server. In yet another example, the consumer may authorize the electronic wallet server, via a remote component running on the merchant website (e.g., a Java applet, etc.) to provide consumer credentials to the electronic wallet server for validation.

When the consumer submits consumer credentials to log into the electronic wallet, the merchant website may forward the consumer credentials and transaction details to the electronic wallet server, which may determine the validity of the consumer credentials. If the consumer's credentials are not valid, the electronic wallet server may deny the payment request and send a notification of denial to the merchant website. In other embodiments, if the consumer provided credentials are valid, the electronic wallet server may process payment from the electronic wallet. For example, the electronic wallet server communicates with the consumer's bank account associated with the electronic wallet and requests a fund transfer of an indicated amount. The electronic wallet server may then store a transaction record.

In some embodiments, after processing the payment, the electronic wallet server sends a payment confirmation notice to the merchant website, which in turn completes the order and stores the transaction record in the database. The merchant website may provide a confirmation page comprising transaction confirmation to the consumer.

Advantages and Benefits

Many advantages are realized by the embodiments of the present invention. As explained above, remote or underdeveloped areas may not have suitable infrastructures to conduct payment transactions. By using embodiments of the invention, all that is required to conduct secure and fast payment transactions is a mobile phone or other mobile communication device.

In addition, in embodiments of the invention, the consumer does not have to remember his entire account number (PAN), which is usually 16+ characters, in order to conduct his banking transactions. Instead, the consumer is issued a unique consumer ID that is 6-8 characters in length and as such is easy to remember. In some embodiments, the consumer ID may be part of the account number itself of some variation of it. Also, the consumer personal account number (PAN) is never stored anywhere in the system. For each transaction, the system generates the consumer PAN using the consumer ID and an identifier associated with the consumer's mobile device, e.g., MSISDN number. This ensures that even if any of the components of the system are compromised, the consumer PAN is safe from being stolen. In addition, generating the consumer PAN 'on-the-fly' eliminates the need for maintaining large consumer databases that are often expensive and prone to attacks. Once a particular banking session is terminated, all data related to that transaction can be purged from the system. Moreover knowledge of how the PAN is constructed from MSISDN is not useful to any fraudster since that PAN cannot be used to access payments from the account.

Thus, the technical advantages provided by embodiments of the invention include the reduction in the need for storing large amounts of data, data security, and the ability to provide users in remote and underdeveloped regions to conduct payment transactions.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:
receiving, at a first server computer associated with a first entity, a set of data elements to transfer funds, wherein the set of data elements comprises an amount associated with the funds to be transferred;

generating, by the first server computer, a one-time temporary use account identifier and a one-time temporary use access code associated with the one-time temporary use account identifier;

transmitting the one-time temporary use account identifier to a mobile communications device, transmitting the one-time temporary use access code to the mobile communications device in a separate message from the one-time temporary use account identifier;

receiving, by the first server computer, a transaction request message from a second server computer associated with a second entity, after the second entity has received the one-time temporary us account identifier and the one-time temporary use access code, via a payment processing network, wherein the transaction request message comprises the amount, the one-time temporary use account identifier, and the one-time temporary use access code, and transmitting a transaction response message to the second server computer associated with the second entity, via the payment processing network;

wherein the transaction response message indicates whether or not transfer of the funds is approved.

2. The method of claim 1, wherein the payment processing network is configured to process credit and debit card transactions.

3. The method of claim 1, wherein the one-time temporary use account identifier is randomly generated using an algorithm.

4. The method of claim 1, wherein the second entity is an issuer of an account identified by the one-time temporary use account identifier, the transaction request message is for a withdrawal transaction, and the funds are transferred from the account to a user of the mobile communication device.

5. The method of claim 1, wherein the second entity is a merchant, the transaction request message is for a purchase transaction, and the funds are transferred from an account identified by the one-time temporary use account identifier to an account of the merchant.

6. The method of claim 1, wherein the one-time temporary use account identifier is associated with the amount of the funds, and the amount of the funds is withdrawn from a user account of a user of the mobile communication device.

7. The method of claim 6, further comprising
determining that the one-time temporary use account identifier remains unused after a predetermined amount of time has expired; and
crediting the amount associated with the one-time temporary use account identifier back to the user account of the user of the mobile communication device.

8. The method of claim 1, wherein the set of data elements comprises a user account identifier of a user account of a user of the mobile communication device.

9. The method of claim 8, further comprising
debiting the user account by the amount of the funds; and
crediting the amount of the funds to the one-time temporary use account identifier.

10. A first server computer comprising a processor, and a non-transitory computer readable medium coupled to the processor, the non-transitory computer readable medium comprising code that, when executed by the processor, causes the processor to perform steps of:
receiving a set of data elements to transfer funds, wherein the set of data elements comprises an amount of the funds to be transferred;

generating a one-time temporary use account identifier and a one-time temporary use access code associated with the one-time temporary use account identifier;

transmitting the one-time temporary use account identifier to a mobile communications device;

transmitting the one-time temporary use access code to the mobile communications device in a separate message from the one-time temporary use account identifier;

receiving a transaction request message from a second server computer associated with a second entity, after the second entity has received the one-time temporary use account identifier and the one-time temporary use access code, via a payment processing network, wherein the transaction request message comprises the amount, the one-time temporary use account identifier, and the one-time temporary use access code; and transmitting a transaction response message to the second server computer associated with the second entity, via the payment processing network;

wherein the transaction response message indicates whether or not transfer of the funds is approved.

11. The first server computer of claim 10, wherein the one-time temporary use account identifier or the one-time temporary use access code is dynamic and is varied for different transactions.

12. The first server computer of claim 10, wherein a format of the one-time temporary use account identifier identifying an account is same as a real account identifier identifying the account.

13. The first server computer of claim 10, wherein the one-time temporary use account identifier is in a virtual form.

14. The first server computer of claim 10, wherein the code, when executed by the processor, further causes the processor to perform steps of:
debiting a user account by the amount of the funds, wherein the set of data elements comprises a user account identifier of the user account;
crediting the amount of the funds to the one-time temporary use account identifier;
determining that the one-time temporary use account identifier remains unused after a predetermined amount of time has expired; and
crediting the amount associated with the one-time temporary use account identifier back to the user account.

15. A method comprising:
transmitting, by a mobile communication device, instructions to initiate a transaction to a computing device of a first entity, wherein the instructions include a set of data elements to transfer funds, wherein the set of data elements comprises an amount associated with the funds to be transferred;
receiving, by the mobile communication device from a server computer of a second entity, a first message including a one-time temporary use account identifier,
receiving, by the mobile communication device from the server computer of the second entity, a second message including a one-time temporary use access code associated with the one-time temporary use account identifier;
transmitting, by the mobile communication device, the one-time temporary use account identifier and the one-time temporary use access code to the computing device of the first entity; and receiving, by the mobile communication device, a third message indicating whether or not transfer of the funds is approved.

16. The method of claim 15, wherein the first entity is an issuer of an account identified by the one-time temporary use account identifier, the transaction is a withdrawal transaction, and the funds are transferred from the account to a user of the mobile communication device.

17. The method of claim 16, wherein the computing device of the first entity is an automated teller machine (ATM).

18. The method of claim 16, wherein the computing device of the first entity is a reader operated by an agent.

19. The method of claim 15, wherein the first entity is a merchant, the transaction is a purchase transaction, and the funds are transferred from an account identified by the one-time temporary use account identifier to an account of the merchant.

20. The method of claim 15, wherein the set of data elements comprises a real account identifier associated with a user account of a user of the mobile communication device.

\* \* \* \* \*

UNITED STATES PATENT AND TRADEMARK OFFICE
CERTIFICATE OF CORRECTION

PATENT NO. : 10,902,397 B2
APPLICATION NO. : 16/675023
DATED : January 26, 2021
INVENTOR(S) : Ashish Kulpati, Joseph Gordon Cooper and Ginger Baker Page 1 of 1

It is certified that error appears in the above-identified patent and that said Letters Patent is hereby corrected as shown below:

In the Claims

Claim 1, Column 31, Line 14, after "temporary" delete "us" and insert --use--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*